US011263407B1

(12) United States Patent
Jawale et al.

(10) Patent No.: US 11,263,407 B1
(45) Date of Patent: Mar. 1, 2022

(54) DETERMINING TOPICS AND ACTION ITEMS FROM CONVERSATIONS

(71) Applicant: Rammer Technologies, Inc., Seattle, WA (US)

(72) Inventors: Toshish Arun Jawale, Seattle, WA (US); Ansup Babu, Balangir (IN); Sekhar Vallath, Pune (IN)

(73) Assignee: Rammer Technologies, Inc., Seattle, WA (US)

( * ) Notice: Subject to any disclaimer, the term of this patent is extended or adjusted under 35 U.S.C. 154(b) by 0 days.

(21) Appl. No.: 17/246,495

(22) Filed: Apr. 30, 2021

Related U.S. Application Data

(60) Provisional application No. 63/073,317, filed on Sep. 1, 2020.

(51) Int. Cl.
*G06F 40/35* (2020.01)
*G06F 40/166* (2020.01)
*G06F 40/253* (2020.01)
*G06F 40/279* (2020.01)
*G06F 3/0484* (2013.01)
(Continued)

(52) U.S. Cl.
CPC ............ *G06F 40/35* (2020.01); *G06F 3/0481* (2013.01); *G06F 3/04842* (2013.01); *G06F 40/166* (2020.01); *G06F 40/253* (2020.01); *G06F 40/268* (2020.01); *G06F 40/279* (2020.01); *G06F 40/289* (2020.01); *G06N 5/04* (2013.01); *G06N 20/00* (2019.01);
(Continued)

(58) Field of Classification Search
CPC ........ G06N 5/04; G06N 20/00; G06F 3/0481; G06F 3/048242; G06F 40/166; G06F 40/253; G06F 40/268; G06F 40/279; G06F 40/289; G06F 40/30; G06F 40/35; G10L 15/1815; G10L 15/22; G10L 15/30
See application file for complete search history.

(56) References Cited

U.S. PATENT DOCUMENTS 8,577,671 B1 11/2013 Barve et al.
9,201,927 B1 * 12/2015 Zhang ..................... G06F 40/30
(Continued)

OTHER PUBLICATIONS

Office Communication for U.S. Appl. No. 17/246,463 dated Jul. 1, 2021, pp. 1-9.
(Continued)

*Primary Examiner* — Eric Yen
(74) *Attorney, Agent, or Firm* — John W. Branch; Branch Partners PLLC

(57) ABSTRACT

Embodiments are directed to organizing conversation information. Two or more machine learning (ML) models and a plurality of sentences provided from a conversation may be employed to generate insight scores for each sentence such that each insight score correlates to a probability that its sentence includes one or more of an action or a question. In response to one or more sentences having insight scores that exceed a threshold value an information score and a definiteness score may be determined for the one or more sentences. And one or more insights associated with the conversation may be generated based on the one or more sentences. A report may be generated that associates the one or more insights with one or more portions of the conversation that include the one or more sentences that are associated with the insights.

28 Claims, 22 Drawing Sheets

(51) Int. Cl.
*G06N 20/00* (2019.01)
*G06N 5/04* (2006.01)
*G06F 3/0481* (2013.01)
*G10L 15/18* (2013.01)
*G10L 15/30* (2013.01)
*G10L 15/22* (2006.01)
*G06F 40/289* (2020.01)
*G06F 40/268* (2020.01)
*G06F 3/04842* (2022.01)

(52) U.S. Cl.
CPC .......... *G10L 15/1815* (2013.01); *G10L 15/22* (2013.01); *G10L 15/30* (2013.01)

(56) References Cited

U.S. PATENT DOCUMENTS

| | | | | |
|---|---|---|---|---|
| 9,367,608 | B1* | 6/2016 | Zhang | G06F 16/35 |
| 10,754,883 | B1* | 8/2020 | Kannu | G06F 16/3334 |
| 2004/0243388 | A1* | 12/2004 | Corman | G06F 40/205 |
| | | | | 704/1 |
| 2005/0278325 | A1* | 12/2005 | Mihalcea | G06F 16/3344 |
| 2007/0156625 | A1* | 7/2007 | Visel | G06K 9/00335 |
| | | | | 706/62 |
| 2013/0046531 | A1* | 2/2013 | Chandramouli | G06F 40/30 |
| | | | | 704/9 |
| 2015/0006155 | A1* | 1/2015 | Tanigaki | G06F 40/30 |
| | | | | 704/9 |
| 2015/0095770 | A1* | 4/2015 | Mani | G06F 40/258 |
| | | | | 715/254 |
| 2015/0186504 | A1 | 7/2015 | Gorman et al. | |
| 2015/0286629 | A1* | 10/2015 | Abdel-Reheem | G06F 40/295 |
| | | | | 704/9 |
| 2016/0179945 | A1 | 6/2016 | Lastra Diaz et al. | |
| 2016/0306791 | A1 | 10/2016 | Alien et al. | |
| 2017/0053206 | A1* | 2/2017 | Kala | G06N 5/02 |
| 2017/0249668 | A1 | 8/2017 | Delort | |
| 2017/0270096 | A1* | 9/2017 | Sheafer | G06F 40/30 |
| 2017/0277781 | A1* | 9/2017 | Deolalikar | G06F 16/345 |
| 2018/0165554 | A1 | 6/2018 | Zhang et al. | |
| 2018/0351899 | A1* | 12/2018 | Kano | H04L 51/16 |
| 2018/0373696 | A1* | 12/2018 | Terry | G06N 5/02 |
| 2019/0005329 | A1* | 1/2019 | Misra | G06K 9/00671 |
| 2019/0042988 | A1 | 2/2019 | Brown et al. | |
| 2019/0294668 | A1* | 9/2019 | Goel | H04N 21/234336 |
| 2019/0332668 | A1* | 10/2019 | Wang | G06N 3/08 |
| 2019/0378513 | A1* | 12/2019 | Carnevale | G06F 40/30 |
| 2019/0384813 | A1* | 12/2019 | Mahmoud | G06F 40/289 |
| 2020/0004517 | A1* | 1/2020 | Legler | G06F 8/4442 |
| 2020/0005117 | A1 | 1/2020 | Yuan et al. | |
| 2020/0110943 | A1 | 4/2020 | Gunawardena | |
| 2020/0143115 | A1* | 5/2020 | Brigham | G06F 40/174 |
| 2020/0279017 | A1* | 9/2020 | Norton | G06F 16/36 |
| 2021/0042467 | A1* | 2/2021 | Liu | G06F 16/9577 |
| 2021/0374677 | A1* | 12/2021 | Michels | G06F 40/35 |

OTHER PUBLICATIONS

Office Communication for U.S. Appl. No. 17/246,463 dated Jul. 8, 2021, pp. 1-6.

* cited by examiner

US 11,263,407 B1

DETERMINING TOPICS AND ACTION ITEMS FROM CONVERSATIONS

CROSS-REFERENCE TO RELATED APPLICATION

This application is a Utility Patent application based on previously filed U.S. Provisional Patent Application No. 63/073,317 filed on Sep. 1, 2020, the benefit of the filing date of which is hereby claimed under 35 U.S.C. § 119(e) and which is further incorporated in entirety by reference.

TECHNICAL FIELD

The present invention relates generally to processing natural language speech, and more particularly, but not exclusively to, determining topics and actions from speech.

BACKGROUND

Machine processing or analysis of conversational speech is becoming increasing important to organizations. Accordingly, organizations may endeavor to capture or analyze speech generated during private/internal meetings, public presentations, customer interactions, or the like. Conventionally, organizations may employ machine transcription services, human transcription services, or hybrid machine-human transcription services to transform natural speech into text suitable for machine analysis, processing, or indexing. Accordingly, organizations may develop databases, search engines, or the like, that enable users to perform analysis of the contents of the captured speech, such as, word/phrase identification (e.g., searching), context free statistical analysis (e.g., word counts, word distributions, or the like), and so on. In some cases, organizations may devote significant resources to train or attempt to train machine learning models that may provide additional insights about conversations. However, the variations in speech patterns, mid-conversation context switches, domain specific vocabulary, cultural specific vocabulary, varying number of speakers in one conversations, or the like, may make it prohibitively expensive or impossible to train the machine learning models necessary for gaining additional insights from capture conversations. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
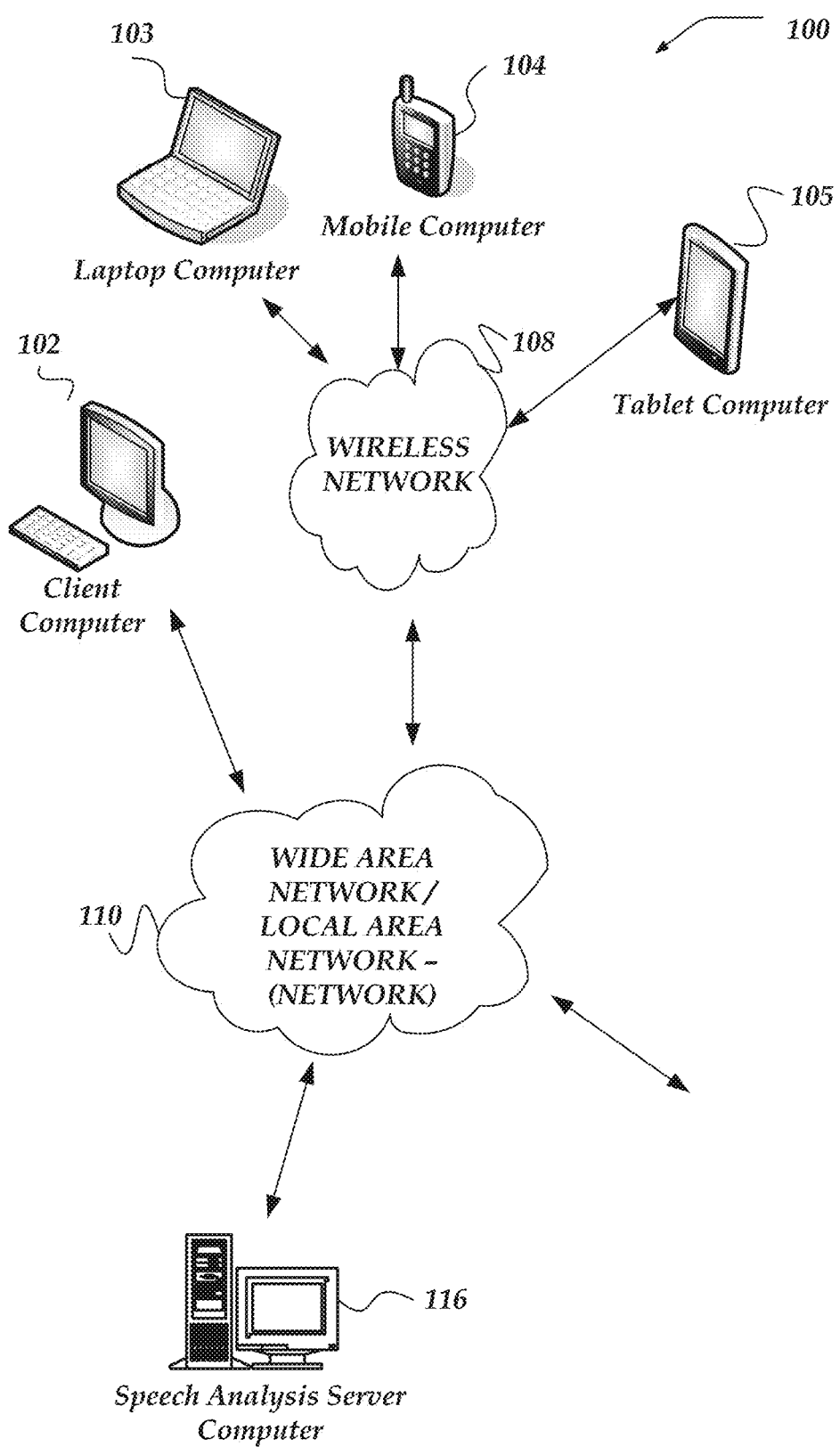
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, Rust, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "conversation" refers to a time-bound exchange of communicative speech between two or more persons. A conversation may be considered time-bound because they have a definite start time and end time. In some cases, a conversation may be a portion of larger conversation, but the conversation (the sub-conversation) may still have its own start time and end time. Also, conversations may be considered synchronous communication among or between two or more people. In some cases, a conversation may include only one speaker that is speaking to other persons (e.g., speeches, presentations, or the like). Conversations may occur in meetings, teleconferences, video conferences, presentations, speeches, or the like. In some cases, conversations may be recorded for playback later. Conversations may include multiple speakers, some who may be more important or more relevant than others. Typically, conversations may include one or more main subjects and one or more topics associated with the main subject. However, reflective of how person communicate, conversations may include portions that may be unrelated to a main subject of topic. For example, in some cases, conversations may include so-called small-talk, irrelevant cross-talk, side discussions, tangential discussions, or the like. Also, conversations, even though conversations may be comprised of synchronous communication exchanges, the subject or topic under consideration may jump around. Even speakers or presenters using well-defined outlines or agenda may jump back and forth within their outline/agenda.

As used herein the terms "conversation graph model" or "graph model" refer to a data structures that may be used to represent relationships between and among different words in a conversation. Graph models may be comprised of nodes and edges stored in the memory of a network computer. In some embodiments, the network computer may automatically update the configuration and composition of the graph model stored in the memory of the network computer to reflect the relationships between two or more words in a conversation. Nodes of the graph model may represent word in a conversation and the edges of the graph model may represent the relationships between the words in the conversation. Graph models may be illustrated herein using conventional node or edge representation, however, underlying data structures may represent graph models using arrays, tables, matrices, multi-dimensional arrays, lists, database tables, or the like.

As used herein the term "configuration information" refers to information that may include rule based policies, pattern matching, scripts (e.g., computer readable instructions), or the like, that may be provided from various sources, including, configuration files, databases, user input, plugins, extensions, loadable libraries, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to processing conversation speech in real-time or offline to determine the structure of the conversation, including key topics. In one or more of the various embodiments, the speech analysis platform may be arranged to generate graph models from the speech words in real-time absent a machine learning models that may require supervised training. In some embodiments, graph models may be generated as speech words are processed or provided.

In some embodiments, conversations may be converted to text (e.g. voice to text) before being provided to a modeling engine that may be arranged to generate conversation graph models. As words may be provided and processed, nodes representing one or more characteristics of the word may be generated and added to a graph model. Also, edges may be added to the graph model representing the strength of the relationships between the words (if any) in the conversation.

In some embodiments, the preliminary graph model may be partitioned into word groups based on the characteristics of the words represented by the model and the relationships.

Further, in some embodiments, separately (or concurrent) word sentences may be determined and processed to generate sentence models that may be used to identify keyphrases within each sentence (if any) based on various characteristics of the works within the sentence.

Further, the modeling engine may be arranged to generate a combined model based on merging the graph model and the sentence models. Accordingly, the combined model may be employed to determine topics and transition between topics. In some embodiments, speech keywords associated with the topics may be mapped to the conversation time-line to enable further analysis, include automatically generate conversation summaries, conversation indices, or the like.

Accordingly, the information included in the combined model may be employed to provide insights about the conversation based on the conversational structure from speech.

In one or more of the various embodiments, two or more machine learning (ML) models and a plurality of sentences provided from a conversation may be employed to generate an insight score for each sentence such that each insight score may be based on two or more partial insight scores that each correspond to an ML model, and such that each insight score correlates to a probability that its sentence includes one or more of an action or a question.

In one or more of the various embodiments, in response to one or more sentences associated with one or more insight scores that exceed a threshold value further actions may be performed, including: determining an information score for the one or more sentences based on a number of included object words, a number of included subject words, a number of included insight words, and one or more included grammatical features; determining a definiteness score for the one or more sentences based on decision-making words included in the one or more sentences such that each sentence that includes more words associated with conclusive decision-making words are scored higher than other sentences that include fewer words associated with conclusive decision-making; generating one or more insights associated with the conversation based on the one or more sentences, the information score associated with each sentence, and the definiteness score associated with each sentence; and generating a report that associates the one or more insights with one or more portions of the conversation that include the one or more sentences that are associated with the insights.

In one or more of the various embodiments, generating the report may include: automatically generating one or more of a task, an appointment, a reminder, or a notification based on the one or more insights; providing one or more of the task, the appointment, the reminder, or the notification to one or more external calendar services.

In one or more of the various embodiments, generating the report may include: generating a user interface that displays an interactive outline of the conversation, wherein one or more descriptions or one or more labels associated with the one or more insights are displayed as one or more outline headings; and in response to a user selecting the one or more outline headings, displaying the one or more portions of the conversation that are associated with the one or more insights that are associated with the one or more selected outline headings.

In one or more of the various embodiments, generating the one or more insights may include: determining one or more action insights that include one or more of an open action item, an unclaimed action item, a closed action item, a follow-up, a task, an idea, or an appointment; and determining one or more question insights that include one or more of an unanswered question, an answered question, or a request.

In one or more of the various embodiments, generating the one or more insights for the conversation may include: determining one or more insight models based on the conversation, wherein each insight model defines one or more rules for determining the one or more insights; executing the one or more rules to identify one or more words included in the one or more sentences that are associated with one or more actions or one or more questions; modifying the one or more identified words by one or more of removing a superfluous word, correcting grammar, or correcting punctuation; and generating the one or more insights based on the one or more modified identified words.

In one or more of the various embodiments, the two or more ML models may be determined based on one or more of locale information, subject matter of the conversation, user preferences, or the like, such that each ML model is paired with an adversarial ML model.

In one or more of the various embodiments, one or more dominant portions of the conversation may be determined based on a conversation digest that corresponds to the conversation. In some embodiments, one or more key subjects may be determined in each of the dominant portions of the conversation, wherein the one or more key subjects are dominant subjects in their respective dominant portion of the conversion. And, in some embodiments, one or more topics of the conversation may be generated based on the one or more key subjects.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, speech analysis server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, speech analysis server computer 116, or other computers.

Client computers 102-105 may further be configured to include a client application that enables an end-user to log into an end-user account that may be managed by another computer, such as v speech analysis server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by speech analysis server computer 116.

Wireless network 108 is configured to couple client computers 103-105 and its components with network 110.

Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, speech analysis server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of speech analysis server computer 116 are described in more detail below in conjunction with FIG. 3. Although FIG. 1 illustrates speech analysis server computer 116, or the like, each as a single computer, the innovations or embodiments are not so limited. For example, one or more functions of speech analysis server computer 116, or the like, may be distributed across one or more distinct network computers. Moreover, in one or more embodiments, speech analysis server computer 116 may be implemented using a plurality of network computers. Further, in one or more of the various embodiments, speech analysis server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
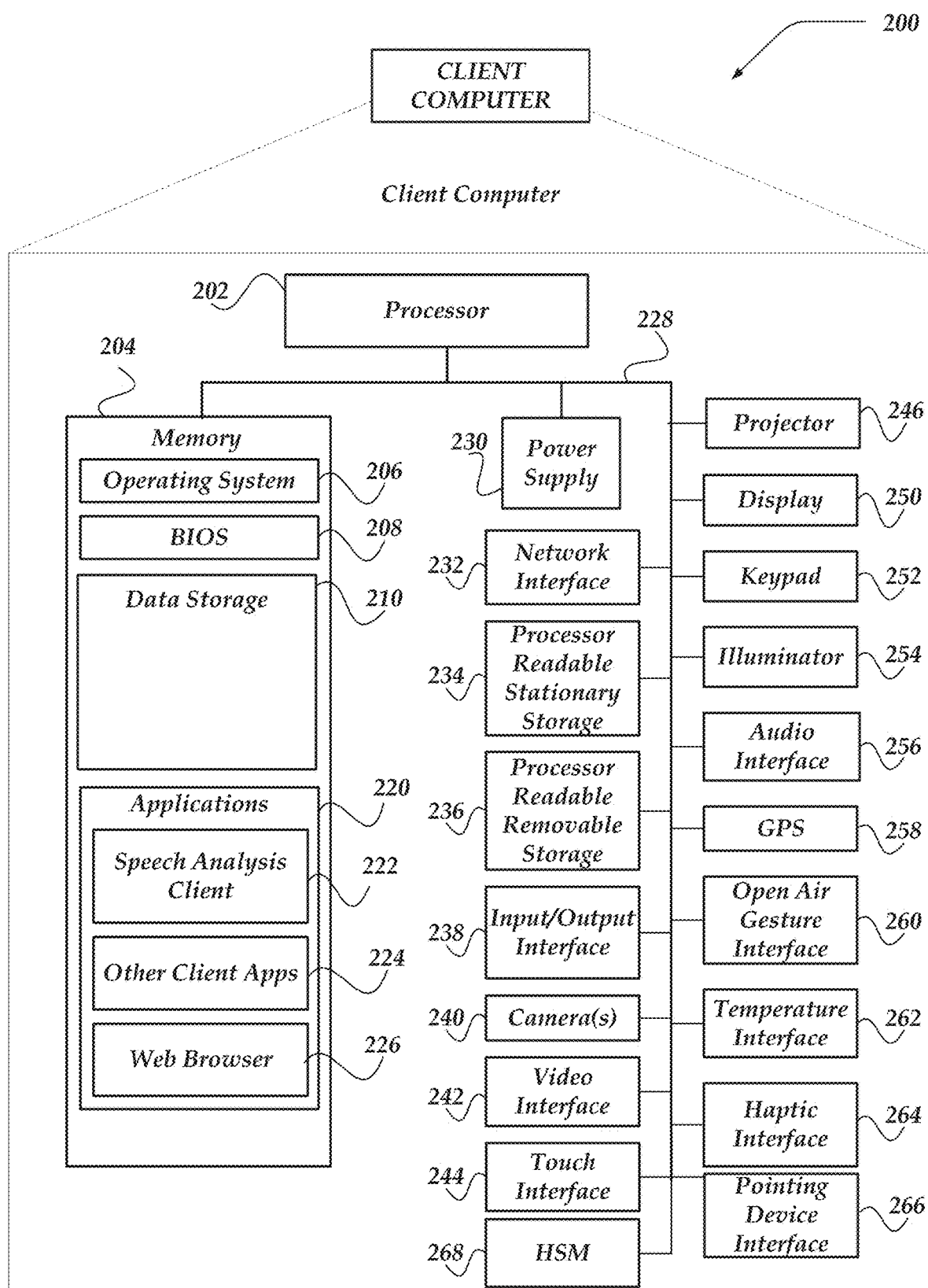
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, speech analysis client 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, speech analysis client 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
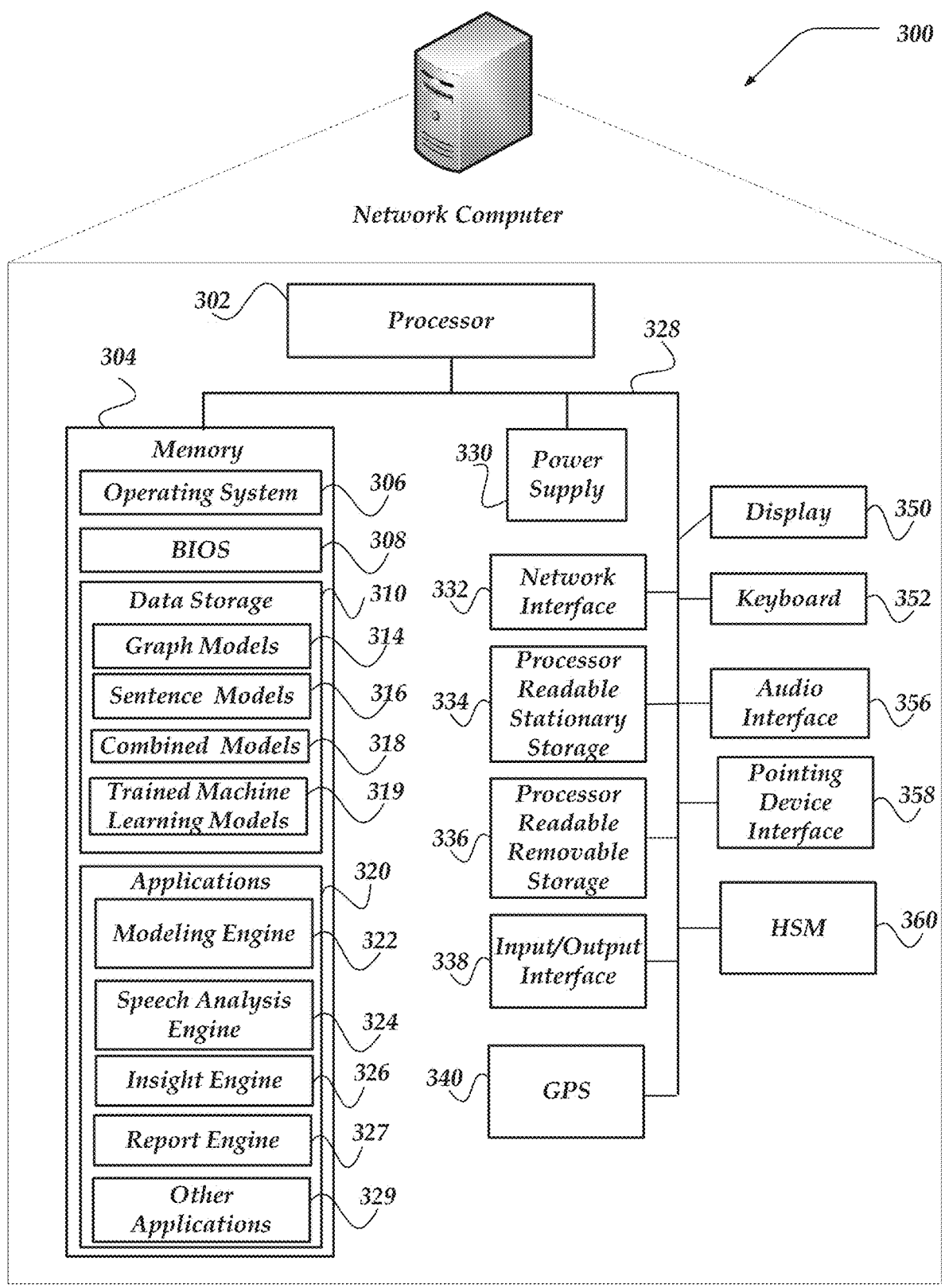
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of speech analysis server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, speech analysis engine 324, insight engine 326, report engine 327, other applications 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geolocation information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, graph models 314, sentence models 316, combined models 318, machine learning models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, speech analysis engine 324, insight engine 326, report engine 327, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, speech analysis engine 324, insight engine 326, report engine 327, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, speech analysis engine 324, insight engine 326, report engine 327, other applications 329, or the like, may be provisioned and de-commissioned automatically.

Also, in one or more of the various embodiments, modeling engine 322, speech analysis engine 324, insight engine 326, report engine 327, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
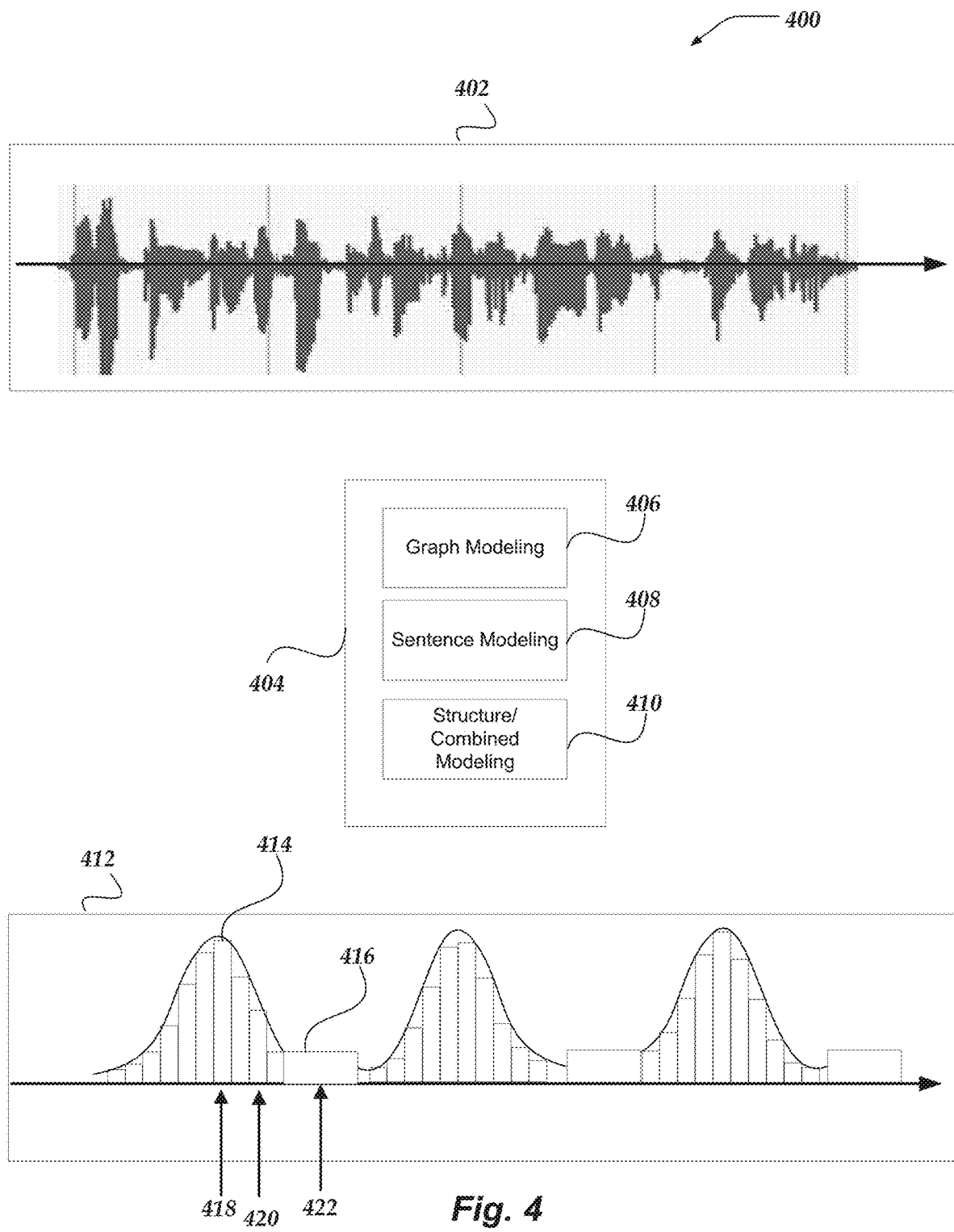
FIG. 4 illustrates a logical architecture of a system for determining conversational structure from speech in accordance with one or more of the various embodiments.

FIG. 4 represents a logical schematic of system 400 for determining conversational structure from speech in accord in accord with one or more of the various embodiments. In one or more of the various embodiments, speech analysis platforms may be arranged to accept audio streams of conversations, such as, audio stream 402. In some embodiments, audio stream 402 may be a recorded audio file that may be processed after the conversation has concluded. In some embodiments, audio streams, such as, audio stream 402 may be real-time streams of audio provided as a conversation is happening.

In one or more of the various embodiments, audio stream 402 may be provided to a speech analysis platform, that includes a modeling engine, such as, modeling engine 404. In some embodiments, modeling engines may be arranged to include various components or sub-engines, such as, graph modeling engine 406, sentence modeling engine 408, combined modeling engine 410, or the like. In some embodiments, graph modeling engine 406, sentence modeling engine 408, combined modeling engine 410 may be arranged to perform one or more actions for determining conversational structure from speech.

In one or more of the various embodiments, modeling engines may be arranged to generate conversation digests, such as, conversation digest 412 based on audio streams, such as, audio stream 402. In one or more of the various embodiments, conversation digests may be data structures that represent conversation audio streams (speech). In some embodiments, conversation digests may be arranged to enable speech analysis engines (not shown) to reliably interpret one or more characteristics of conversations. In some embodiments, conversation digests may be arranged to represent the contextual structure of a conversation.

In one or more of the various embodiments, conversation digests may be arranged to represent a conversation as a sequence of topic portions and connection portions. In some embodiments, topic portions may be portion of a conversation that include material topic information. In contract, in some embodiments, connection portions of a conversation represent the transition from one topic portion to another. In some embodiments, topic portions may be referred to as blocks and connection portions may be referred to as hinges. Herein, the terms topic portions and connection portions may be considered to mean the same thing as block and hinges. For brevity and clarity, the term blocks will used to represent the topic portions of conversation digests and the term hinges will be used to represent the connection portion of conversation digests.

In this example, for some embodiments, conversation digest 412 includes one or more blocks, such as, block 414 and one or more hinges, such as, hinge 416. Further, in some embodiments, blocks may be associated with one or more topics or sub-topics of a conversation. In this example, block 414 includes topic 418 and sub-topic 420.

In one or more of the various embodiments, topics may correspond to key words in the conversation. In some blocks, there may be one word that may be determined to the key topic while some other words may be sub-topics that are related to the key topic. Also, in some embodiments, some words that occur in the part of conversation corresponding to a block may be not be topics. In this example, topic 418 may be considered a key topic while topic 420 may be sub-topic related to topic 418.

Further, conversations or portions of conversations occur over a period of time from start to finish. Accordingly, in some embodiments, the time sequence or timeline of the actual conversation may be maintained in the correspond conversation digest. In this example, timeline 422 represent the time sequence of the audio stream 402 and conversation digest 412. Thus, in some embodiments, the first block (e.g., block 414) of a conversation digest may correspond to the begin portion of its source audio stream.

In one or more of the various embodiments, audio streams, such as, audio stream 402 may be converted into text. In some embodiments, a speech analysis platform may be arranged to employ conventional or customized speech-to-text facilities to convert audio streams of conversations into text suitable for additional processing. In some embodiments, the text version of the conversation may be associated with index or counter values that may correspond to the timeline of the conversation. Thus, in some embodiments, speech analysis platforms may be enabled to associate various words to when they appeared in the audio stream or the conversation timeline.

In one or more of the various embodiments, modeling engines, such as, modeling engine 404 may be arranged to generate a conversation graph model that represents the conversation. In some embodiments, conversation graph models (not shown) may be comprised of nodes that represent words of the conversation and edges that represent relationships between the words in the conversation.

Also, in one or more of the various embodiments, modeling engines may be arranged to generate sentence models for the sentences comprising a conversation.

Further, in one or more of the various embodiments, modeling engines may be arranged to generate one or more combined models based on information derived from conversation graph models and sentence models. Accordingly, in some embodiments, modeling engines may be arranged to generate conversation digests from combined models.

In one or more of the various embodiments, speech analysis engines, such as, speech analysis engine 324, or the like, may be arranged employ conversation digests to generate reports, responses, or the like, in response to on one or more queries.

Figure 5:
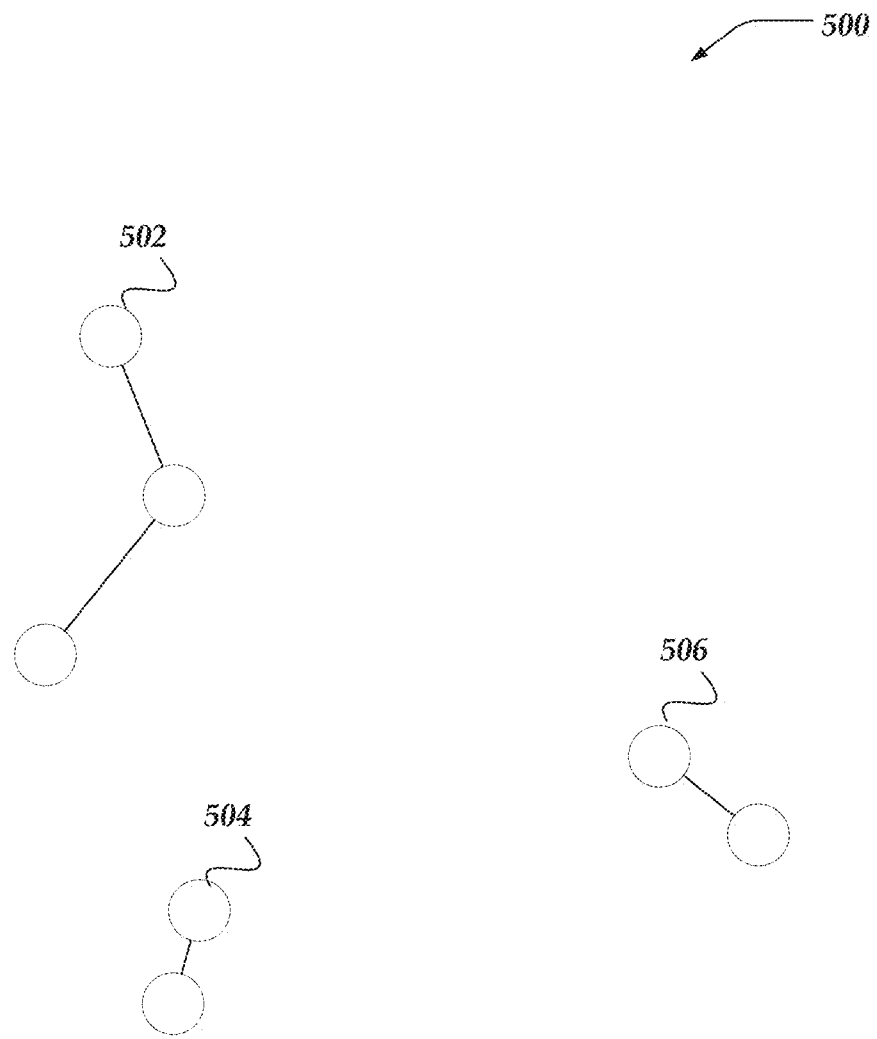
FIG. 5 illustrates a logical schematic of a graph model for determining conversational structure from speech in accordance with one or more of the various embodiments.

FIG. 5 illustrates a logical schematic of graph model 500 for determining conversational structure from speech in accord with one or more of the various embodiments. In some embodiments, graph models may be comprised on one or more nodes connected by one or more edges. In some embodiments, nodes in a graph model may represent individual words in a conversation. Similarly, in some embodiments, edges in the graph model may represent relationships between the words in the conversation.

In one or more of the various embodiments, modeling engines may be arranged to progressively generate graph models as words of a conversation may be provided. In this example, for some embodiments, node 502 may represent a word from a conversation. Likewise, in some embodiments, node 504 and node 506 may represent other words in the conversation that have a relationship with the word represented by node 502. Similarly, node 508, node 510, and node 512 may represent other words. In this example, node 508 and node 510 are related, as indicated by the edge connecting them. In contrast, in some embodiments, node 512 may be unconnected to other nodes because the modeling engine has not discovered words related to the word represented by node 512. Further, in this example, the sub-graph that is rooted by node 502 may be considered too unrelated to the sub-graph rooted by node 508 except that both are in the same conversation.

In one or more of the various embodiments, as additional words of the conversation are provided to the modeling engine, additional nodes or edges may be added to graph model 500 depending on the words and their associated characteristics.

In one or more of the various embodiments, one or more characteristics of a word may be associated with its corresponding node. In some embodiments, nodes in graph models may be arranged to include one or more attributes that represent one or more characteristics of a word. For example, the one or more attributes may represent information, such as, time mark of the word, word counts, one or more references into the full conversation, one or more references to the source audio stream, or the like.

Also, in one or more of the various embodiments, the edges of a graph model may be arranged to be associated with one or more attributes that represent one or more characteristics of the relationship between the connected word nodes.

In one or more of the various embodiments, modeling engines may be arranged to associate or infer a strength of the relationship between words based on various characteristics of the conversation, the individual word, or nearby words.

In one or more of the various embodiments, modeling engines may be arranged to exclude or filter one or more words from being included in graph models. In some cases, modeling engines may be arranged to refer to a list or stop words, or the like, that may be excluded from graph models. In some embodiments, modeling engines may be arranged to employ standard, conventional, or customized lists of words to exclude from the graph model. In some embodiments, modeling engines may be arranged to enable users or organizations to modify lists of excluded words. Accordingly, in some embodiments, modeling engines may be arranged to employ configuration information to determine the specific words to exclude.

Figure 6:
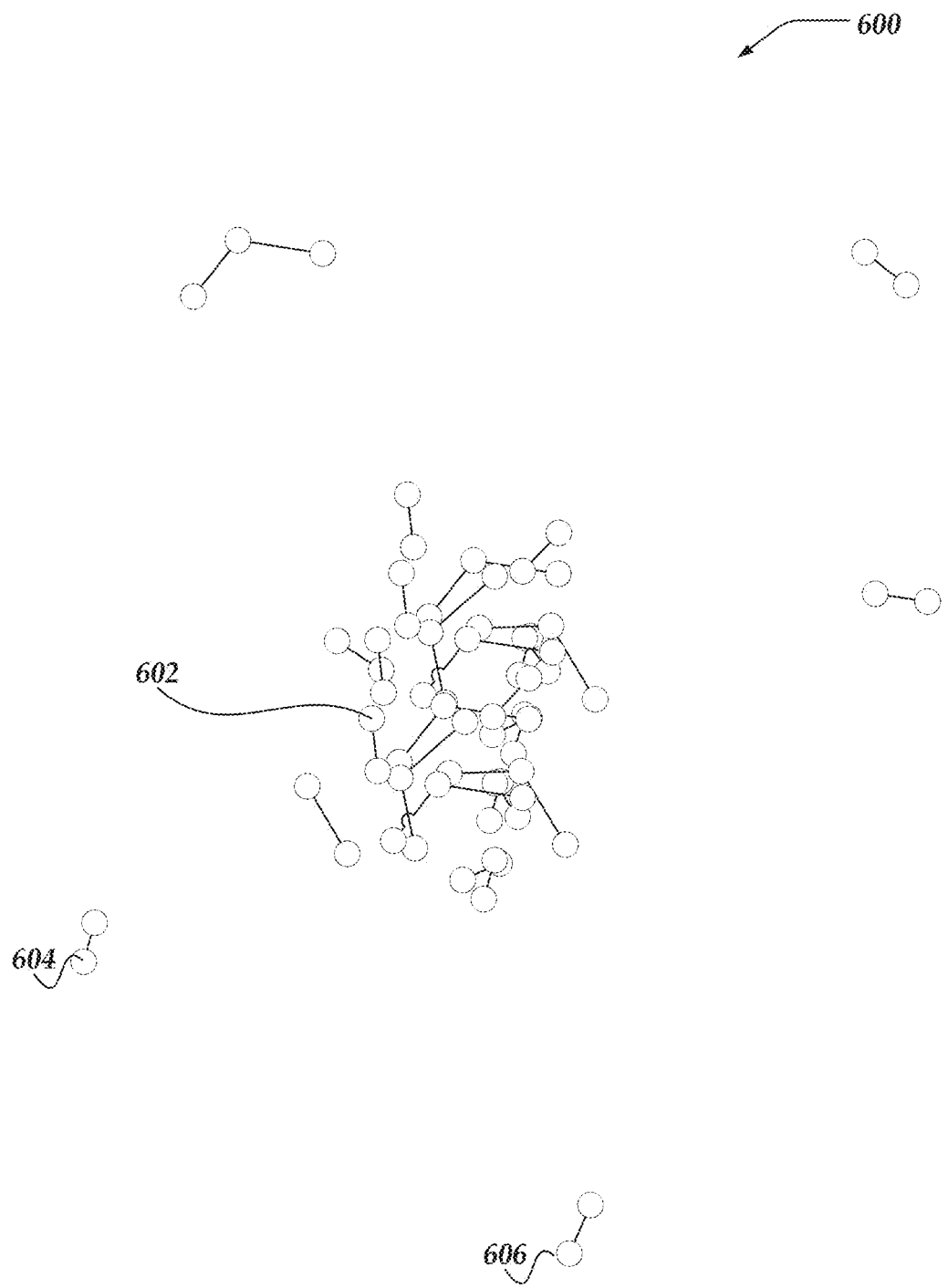
FIG. 6 illustrates a logical schematic of a graph model that represents a conversation model that may be employed to determine conversational structure from speech in accordance with one or more of the various embodiments.

FIG. 6 illustrates a logical schematic of graph model 600 that represents a conversation graph model that may be employed to determine conversational structure from speech in accordance with one or more of the various embodiments. In this example, graph model 600 may be considered similar to graph model 500 except it represents many more words that are shown for graph model 500.

In one or more of the various embodiments, as words may be provided to modeling engines, the modeling engines may be arranged to generate graph models, such as, graph model 600. In some embodiments, if the conversation has an overall topic or theme (as most conversations between people do), words related to the overall topic or theme of the conversation may cluster together in the graph model, as shown here where node 602 and its neighbors may be considered to represent words clustered together. Likewise, in some embodiments, words that may be less related to the core topics or themes of a conversation may be logically isolated as represented by node 604 and node 606.

Figure 7:
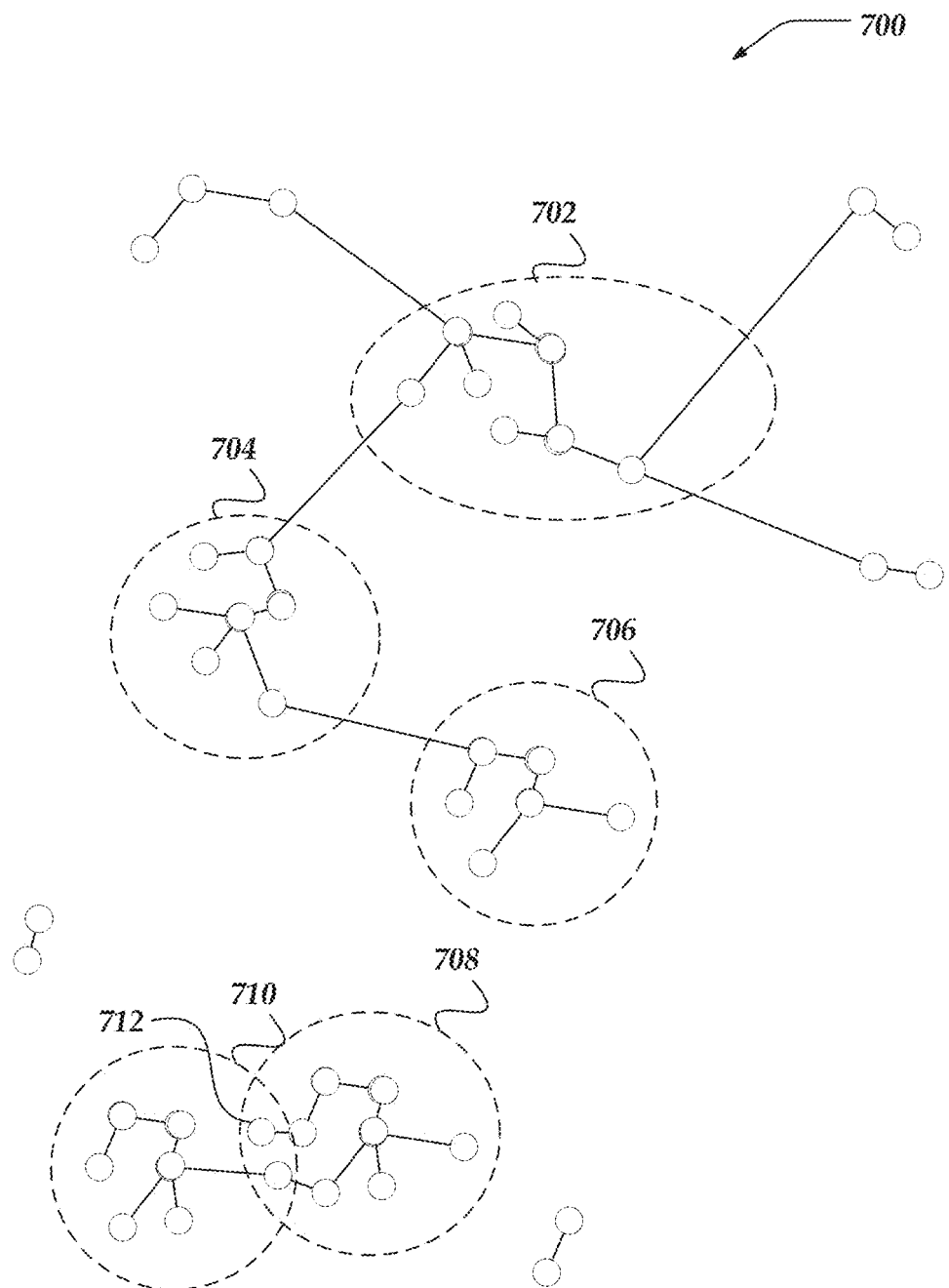
FIG. 7 illustrates a logical schematic of partitioned a graph model that represents a conversation model partitioned to determine related word groups in a conversation to determine conversational structure from speech in accordance with one or more of the various embodiments.

FIG. 7 illustrates a logical schematic of partitioned graph model 700 representing a conversation model partitioned to determine related word groups in a conversation to determine conversational structure from speech in accordance with one or more of the various embodiments. In this example, graph model 700 may be considered similar to graph model 600 or graph model.

In one or more of the various embodiments, modeling engines may be arranged to automatically partition graph models into various clusters of words. In this example, partition 702, partition 704, or partition 706 may represent clusters of words that the modeling engine has determined to be sufficiently related to each other such that may be grouped together.

In one or more of the various embodiments, modeling engines may be arranged to execute one or more clustering/ partition algorithms to partition graph models. In some embodiments, partitioning may be a continuous process that may process graph models as new nodes or edges may be added. In some embodiments, one or more partitions may overlap. Accordingly, in some embodiments, modeling engines may be arranged to perform additional processing to separate overlapped partitions. In some embodiments, modeling engines may be arranged to determine one or more nodes, such as, node 712 that may be claimed by two or more partitions. In some embodiments, modeling engines may be arranged to assign nodes claimed by two or more nodes to one of the nodes and then evaluate the stability of partitions after the assignment.

In one or more of the various embodiments, modeling engines may be arranged to iteratively evaluate the strength of relationships between words in graph models to partition the words of the conversation. As more words are collected from a conversation, the graph models and the partitions may begin to stabilize or otherwise reach equilibrium.

Generalized Operations for Determining Conversational Structure

FIGS. 8-14 represent generalized operations for determining conversational structure from speech in accordance with one or more of the various embodiments. In one or more of the various embodiments, processes 800, 900, 1000, 1100, 1200, 1300, and 1400 described in conjunction with FIGS. 8-14 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-14 may be used for determining conversational structure from speech in accordance with at least one of the various embodiments or architectures such as those described in conjunction with FIGS. 4-7. Further, in one or more of the various embodiments, some or all of the actions performed by processes 800, 900, 1000, 1100, 1200, 1300, and 1400 may be executed in part by modeling engine 322, speech analysis engine 324, insight engine 326, report engine 327, or the like, by one or more processors of one or more network computers.

Figure 8:
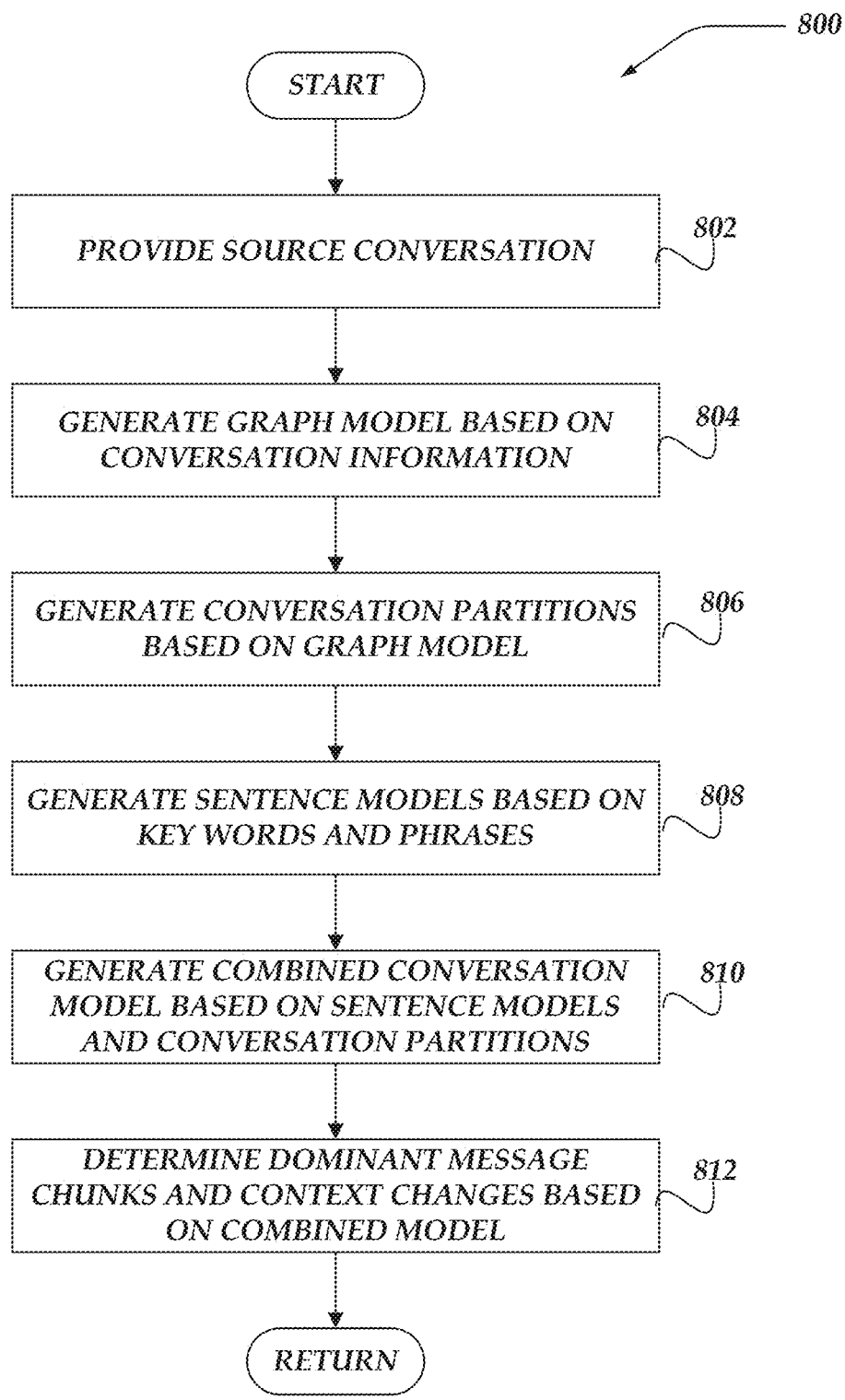
FIG. 8 illustrates an overview flowchart for a process for determining conversational structure from speech in accordance with one or more of the various embodiments.

FIG. 8 illustrates an overview flowchart for process 800 for determining conversational structure from speech in accordance with one or more of the various embodiments. After a start block, at block 802, in one or more of the various embodiments, a source conversation may be provided to a modeling engine. In one or more of the various embodiments, a source conversation may be provided from a real-time audio stream of an ongoing conversation, meeting or presentation. In some cases, source conversations may include two or more persons. In other cases, source conversations may be one or more persons presenting or otherwise speaking to an audience. Also, in some embodiments, the source conversation may be provided via a recording of the conversation.

In one or more of the various embodiments, source conversations may be processed in real-time or in-advance to generate text from audio streams. In some embodiments, the speech-to-text processing may be performed by a thirdparty/external service. Also, in some embodiments, modeling engines may be arranged to execute one or more conventional or non-conventional speech-to-text processing techniques to convert audio streams of conversations into text.

In one or more of the various embodiments, modeling engines may be arranged to process conversations word-by-word, sentence-by-sentence, paragraph-by-paragraph (snippets), or the like. In some embodiments, conversations may be provided with additional meta-data, including, time-stamp/time-line markers, channel markers, references or identifiers to portions/locations in the source audio stream, or the like. Also, in some embodiments, conversation words may be provided as a stream of text words. In some embodiments, conversation meta-data may include tags or markers that indicate conversational whitespace, such as, quiet periods, stops, starts, dead-air, or the like.

Note, herein unless the context or usage is clearly to the contrary, conversations, words, sentences, or the like, may be considered to be text that has been generated from a text-to-speech process, service, or the like. Also, in some embodiments, conversations may be provided from text sources, such as, text chats, online forum posts/comments, other text documents, or the like.

At block 804, in one or more of the various embodiments, the modeling engine may be arranged to generate a graph model based on conversation information derived from the source conversation. In one or more of the various embodiments, modeling engine may be arranged to add individual words to a graph model. In some embodiments, each word may be included as a node in the graph model. In some embodiments, one or more relationships between each word and other words may be represented by edges in the graph model.

In one or more of the various embodiments, modeling engine may be arranged to generate one or more metrics based on one or more characteristics of the word or conversation to determine the existence of a relationship as well as the strength of the relationships. Accordingly, in some embodiments, edges in the graph model may be associated with at least one attribute that represents the strength of the relationship.

At block 806, in one or more of the various embodiments, the modeling engine may be arranged to generate one or more conversation partitions based on the graph model. In one or more of the various embodiments, modeling engines may be arranged to perform one or more actions to partition the graph model into clusters of nodes based on the strength of the relationships between words in the graph model.

At block 808, in one or more of the various embodiments, the modeling engine may be arranged to generate one or more sentence models based on key words or phrases included in sentences provided in the source conversation. In addition to generating a graph model representing the conversation, modeling engine may be arranged to generate sentence models based on sequences of words determined be in the same sentence.

In one or more of the various embodiments, modeling engines may be arranged to determine key phrases in each sentence based on the sentence models.

At block 810, in one or more of the various embodiments, the modeling engine may be arranged to generate a combined conversation model based the one or more sentence models and the partitioned graph model.

At block 812, in one or more of the various embodiments, the modeling engine may be arranged to determine one or more dominant conversation portions and one or more context changes based the combined conversation model.

Next, in one or more of the various embodiments, control may be returned to a calling process.

Figure 9:
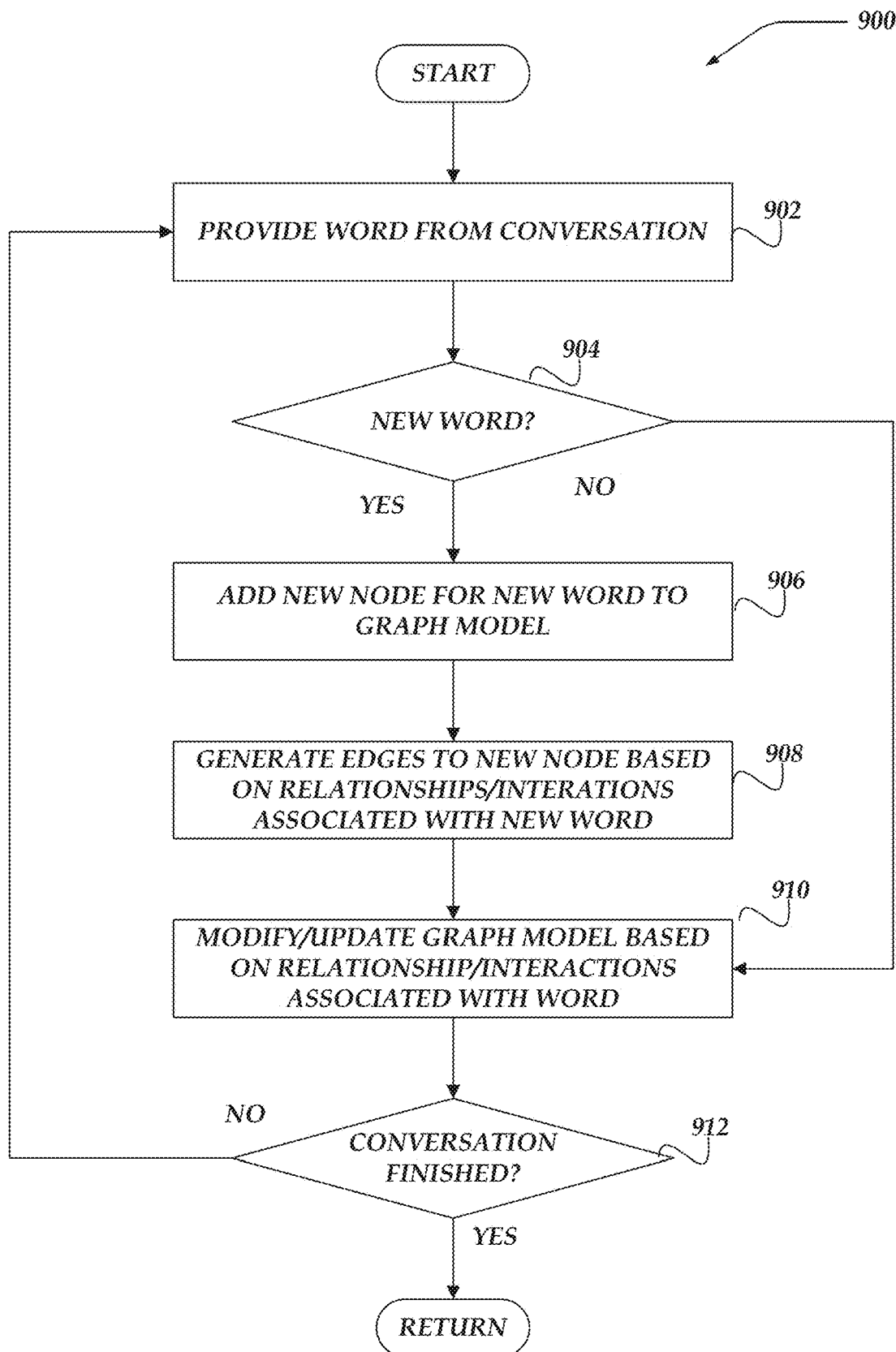
FIG. 9 illustrates a flowchart for a process for generating graph models from conversation words for determining conversational structure from speech in accordance with one or more of the various embodiments.

FIG. 9 illustrates a flowchart for process 900 for generating graph models from conversation words for determining conversational structure from speech in accordance with one or more of the various embodiments. After a start block, at block 902, in one or more of the various embodiments, a word from a conversation may be provided to a modeling engine.

At decision block 904, in one or more of the various embodiments, if word is new, control may flow to block 906; otherwise, control may flow to block 910. In one or more of the various embodiments, modeling engines may be arranged to process conversational speech. In some embodiments, conversational speech may be provided from a variety of sources. In some embodiments, speech may be provided in real-time from ongoing conversations. Also, in some embodiments, speech may be provided from recorded conversations, or the like.

At block 906, in one or more of the various embodiments, the modeling engine may be arranged to add a new node for the new word to the graph model. In some embodiments, modeling engines may be arranged to exclude words deemed unimportant from the graph model. In some embodiments, such words may be words that are known to carry little information. In some cases, such words may be referred to as stop words. Accordingly, in some embodiments, modeling engines may be arranged to compare incoming words against a dictionary, catalog, or list that includes the words that should be discarded or otherwise ignored. In some embodiments, some or all of the words may be provided from conventional lists of stop words. Also, in some embodiments, modeling engines may be arranged to enable users or organizations to customize the discard list by adding or removing words. Accordingly, in some embodiments, modeling engines may be arranged to determine one or more of the words to discard based on configuration information to account for local requirements or local circumstances.

At block 908, in one or more of the various embodiments, the modeling engine may be arranged to generate one or more edges for the new node based on one or more relationships or one or more interactions associated with the new word.

In one or more of the various embodiments, edges represent relationships between words in a conversation. In some embodiments, edges may be associated with one or more attributes that may represent different aspects or dimensions of the relationships words may have with each other.

At block 910, in one or more of the various embodiments, the modeling engine may be arranged to modify/update the graph model based on the one or more relationships or the one or more interactions determined to be associated with the new word.

At decision block 912, in one or more of the various embodiments, if the all the words in the conversation have be processed, control may be returned to a calling process; otherwise, control may loop back to block 902 to process the next remaining words.

Next, in one or more of the various embodiments, control may be returned to a calling process.

Figure 10:
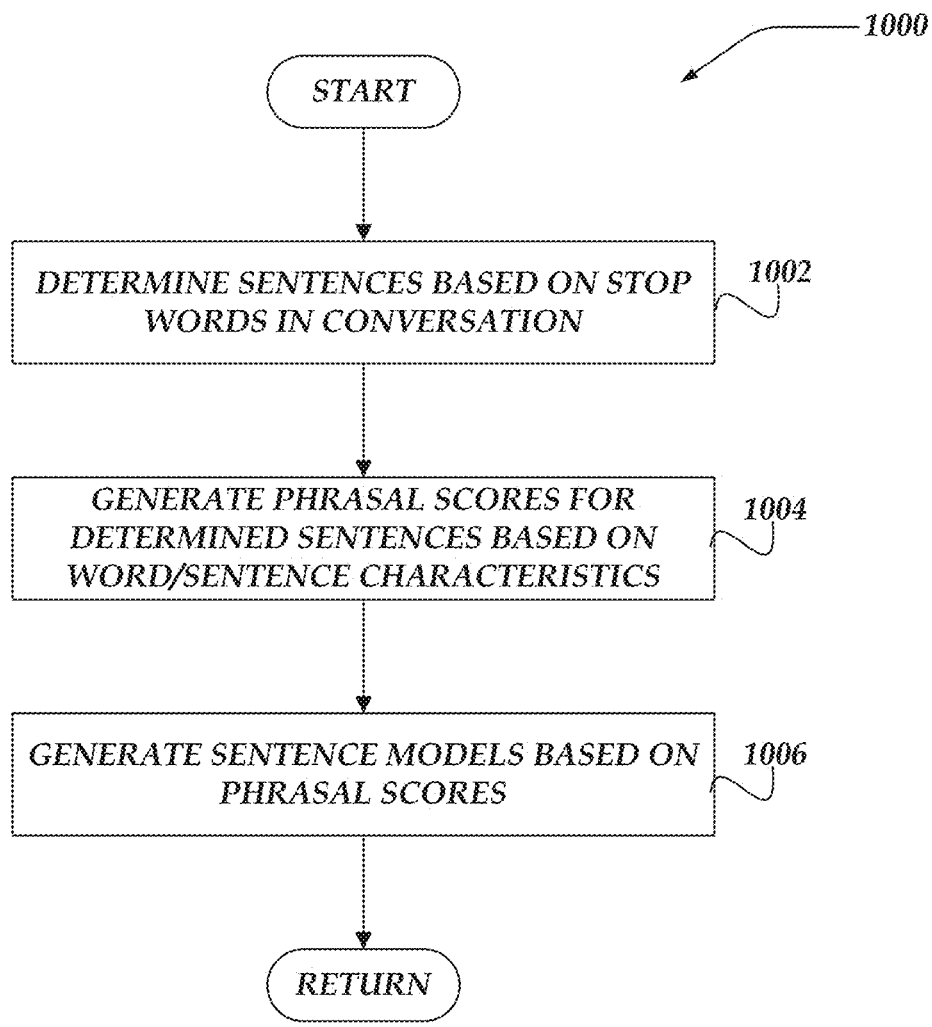
FIG. 10 illustrates a flowchart for a process for generating sentence models from conversation words for determining conversational structure from speech in accordance with one or more of the various embodiments.

FIG. 10 illustrates a flowchart for process 1000 for generating sentence models from conversation words for determining conversational structure from speech in accordance with one or more of the various embodiments. After a start block, at block 1002, in one or more of the various embodiments, a modeling engine may be arranged to determine one or more sentences based on one or more stop words or other signals included in the source conversation.

At block 1004, in one or more of the various embodiments, the modeling engine may be arranged to generate phrasal scores for the sentences based on one or more characteristics of the of the words or phrases included in the sentence. In one or more of the various embodiments, modeling engine may be arranged to determine key phrases in sentences to enable the key phrases to be matched with key words of partitions from the graph model.

In one or more of the various embodiments, modeling engines may be arranged to perform one or more actions to determine and score phrases in sentences to determine the key phrases. In some embodiments, modeling engines may be arranged to employ various strategies for scoring phrases. In some embodiments, different languages may require different scoring strategies that may account for grammatical or linguistic differences. Accordingly, in some embodiments, modeling engines may be arranged to organizations or users may modify how phrases are scored based on local requirement or local circumstances. Thus, in some embodiments, modeling engines may be arranged to employ rules, instructions, parameter values, or the like, provided via configuration information to account for local circumstances or local requirements.

In one or more of the various embodiments, modeling engines may be arranged to assume that conversations may be driven by the key phrases. Accordingly, in some embodiments, if the key phrases may be determined, the modeling engine may associate the key phrases (and their corresponding sentences) with the partitions that include key words that comprise the key phrases.

Accordingly, in some embodiments, modeling engines may be arranged to determine phrasal scores by generating a sub-graph of the sentences. In some embodiments, modeling engines may be arranged to separate the words in sentences based on one or more stop words. In some embodiments, stop words may be provided from a standard or conventional list of stop words for a given language. In some embodiments, modeling engines may be arranged to enable users or organizations to customize the stop word lists to account for local requirements. For example, in some embodiments, one or more conventional stop words may have different meanings or importance in some subject matter domains, language dialects, or languages, or the like. Accordingly, in some embodiments, modeling engines may be arranged to determine the actual stop words based on configuration information.

In some embodiments, modeling engines may be arranged to determine one or more phrases by determining one or more contiguous blocks or sets of words in the sentence that were separated by stop words. For example, if a sentence includes "A fine brown cow is ready to make a cheese pizza", modeling engines may determine the following phrases: "fine brown cow", "ready", "make", "cheese pizza".

At block 1006, in one or more of the various embodiments, the modeling engine may be arranged to generate one or more sentence models based on the phrasal scores.

In one or more of the various embodiments, sentence models may rank the phrases in the sentences based on phrasal scoring. In one or more of the various embodiments, the phrases with the highest scores may be considered the key phrase in a sentence.

In one or more of the various embodiments, modeling engines may be arranged to rank phrases in the sentence based on at least the number of times a phrase is repeated in a sentence, word-degree of words in the phrases, length of a phrase scaled with respect to the word-degree of the sentence.

In one or more of the various embodiments, modeling engines may be arranged to compute word degree scores for phrases by determining a degree score for each word included in sentence phrases and adding them together. For example, a sentence that includes "A scoop of ice cream" may be broken into the following phrases: "scoop", "ice cream" after stop words are removed.

In this example, the modeling engines may be arranged to determine a degree score for each word based on how often a word occurs with other words in phrases of the sentence. In this example, the word "scoop" occurs once with no other words, so it has a degree score of 1. In contrasts, the word "ice" occurs with the word "cream" so it has a degree score of 2. Also, in this example, the word "cream" occurs with the word "ice" so it also has a degree score of 2.

Determining the repetition score for each phrase in this example, results in a repetition scores of 1 for "scoop" and 1 for "ice cream". Accordingly, in this example, modeling engines may be arranged to generate phrase scores by dividing the degree scores of phrase by its frequency score. In this example, the degree score for "scoop" is 1 and its frequency score is 1, thus its phrase score is 1. Also, in this example, the degree score for "ice cream" is 4 and its frequency score is 1, so its phrase score is 4. Thus, in this example, "ice cream" may be the phrase in the sentence "A scoop of ice cream" with the highest phrase score. Note, in practice, more than one phrase in a sentence may have the same phrase score.

In one or more of the various embodiments, if the phrase scores for a sentence may be determined, the phrases may be ranked ordered based on the phrase scores.

In one or more of the various embodiments, modeling engines may be arranged to combine the sentence models and the graph model (the conversation partitions) to provide a combined model.

Next, in one or more of the various embodiments, control may be returned to a calling process.

Figure 11:
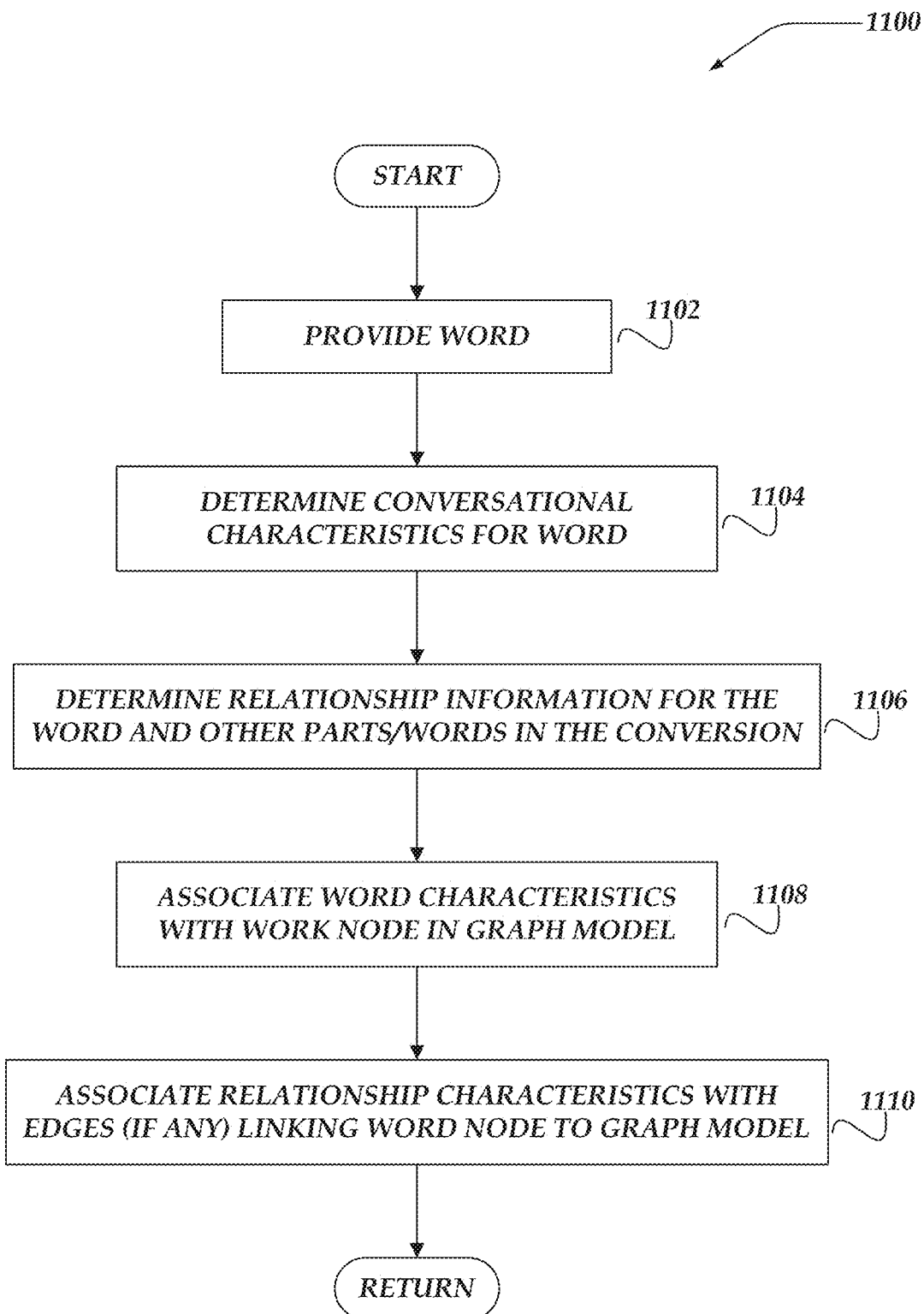
FIG. 11 illustrates a flowchart for a process for generating nodes or edges for a graph model based on conversation words for determining conversational structure from speech in accordance with one or more of the various embodiments.

FIG. 11 illustrates a flowchart for process 1100 for generating nodes or edges for a graph model based on conversation words for determining conversational structure from speech in accordance with one or more of the various embodiments. After a start block, at block 1102, in one or more of the various embodiments, a word may be provided to a modeling engine. After a conversation is converted from voice to text, in some embodiments, individual words from the conversation may be provided to the modeling engine.

At block 1104, in one or more of the various embodiments, the modeling engine may be arranged to determine one or more conversation characteristics for the provided word.

In one or more of the various embodiments, modeling engines may be arranged to discard one or more unimportant words that may be determined from a list, catalog, or dictionary. In some cases, for some embodiment, the discarded words may be referred to as stop words. In some embodiments, modeling engines may be arranged to enable users or organizations to determine some or all of the stop words. Thus, in some embodiments, modeling engines may be arranged to enable users or organizations to define additional unimportant words by adding them to the list of unimportant words. Likewise, in some embodiments, modeling engines may be arranged to enable users or organizations to remove one or more words from the list of unimportant words.

At block 1106, in one or more of the various embodiments, the modeling engine may be arranged to determine relationship information for the provided word and other phrases or words in the conversation. In some embodiments, words that closely follow each other in a conversation may be associated because of their proximity in time. In some embodiments, such words may be assigned an edge to indicate this relationship. Likewise, in some embodiments, modeling engines may be arranged to employ edges to encode various relationships between or among words, such as, co-occurrence (two words appearing together in a sentence), collocation (two words appearing next to each other or separated by a function word), syntactic structure (e.g., the parent and child in a syntactic dependency), lexical similarity (e.g., cosine between the vector representations of two sentences).

At block 1108, in one or more of the various embodiments, the modeling engine may be arranged to associate the one or more word characteristics with the word node in the graph model. In some embodiments, nodes in graph models may correspond to individual words. However, in some embodiments, modeling engines may be arranged to associate characteristics or metrics, such as, word counts, timeline information, indexing information, or the like, with a word by associating them with a node in the graph model that corresponds to the word.

In one or more of the various embodiments, modeling engines may be arranged to represent each word with a vector such that each element of the vector corresponds to characteristic or metric of the word. In some embodiments, these characteristics may include the various metrics above, as well as, various word features, such as, part of speech, gender, sentiment information, or the like.

At block 1110, in one or more of the various embodiments, the modeling engine may be arranged to associate one or more relationship characteristics with one or more edges (if any) linking the word node to the graph model.

In one or more of the various embodiments, each type of relationship may be associated with scoring/weighting function that provides a score that may represent the strength or intensity of the relationship. In some embodiments, modeling engines may be arranged to provide partial scores for different types of relationships between words that may be combined to provide a relationship score that encapsulate to combined strength of the one or more types of relationships.

In some embodiments, the particular relationships of interest may vary depending subject matter, user or organization preference, or the like. Also, in some embodiments, relationships may be considered or disregarded for various reasons, such as, compute performance, impact or importance of the relationship, or the like. Accordingly, in some embodiments, modeling engines may be arranged to employ rules, instructions, or the like, provided via configuration information to determine the particular relationships that may be considered or captured for conversation. Likewise, in some embodiments, modeling engines may be arranged to employ rules, formulas, or the like, provided via configuration information to determine how generate the score or weight value for a given relationship. For example, in some embodiments, one or more relationships may be associated with a scoring formula that provides continuous scalar results, whereas one or more other relationships may be considered categorical such as it either exists or it does not exist, thus the scoring formula may produce a fixed value if the relationship may be present or a zero or null value if the relationship may be absent.

In some embodiments, modeling engines may be arranged to employ one or more rules or threshold values that may be employed to reject or disregard one or more relationships if the relationship score falls below a defined threshold.

Next, in one or more of the various embodiments, control may be returned to a calling process.

Figure 12:
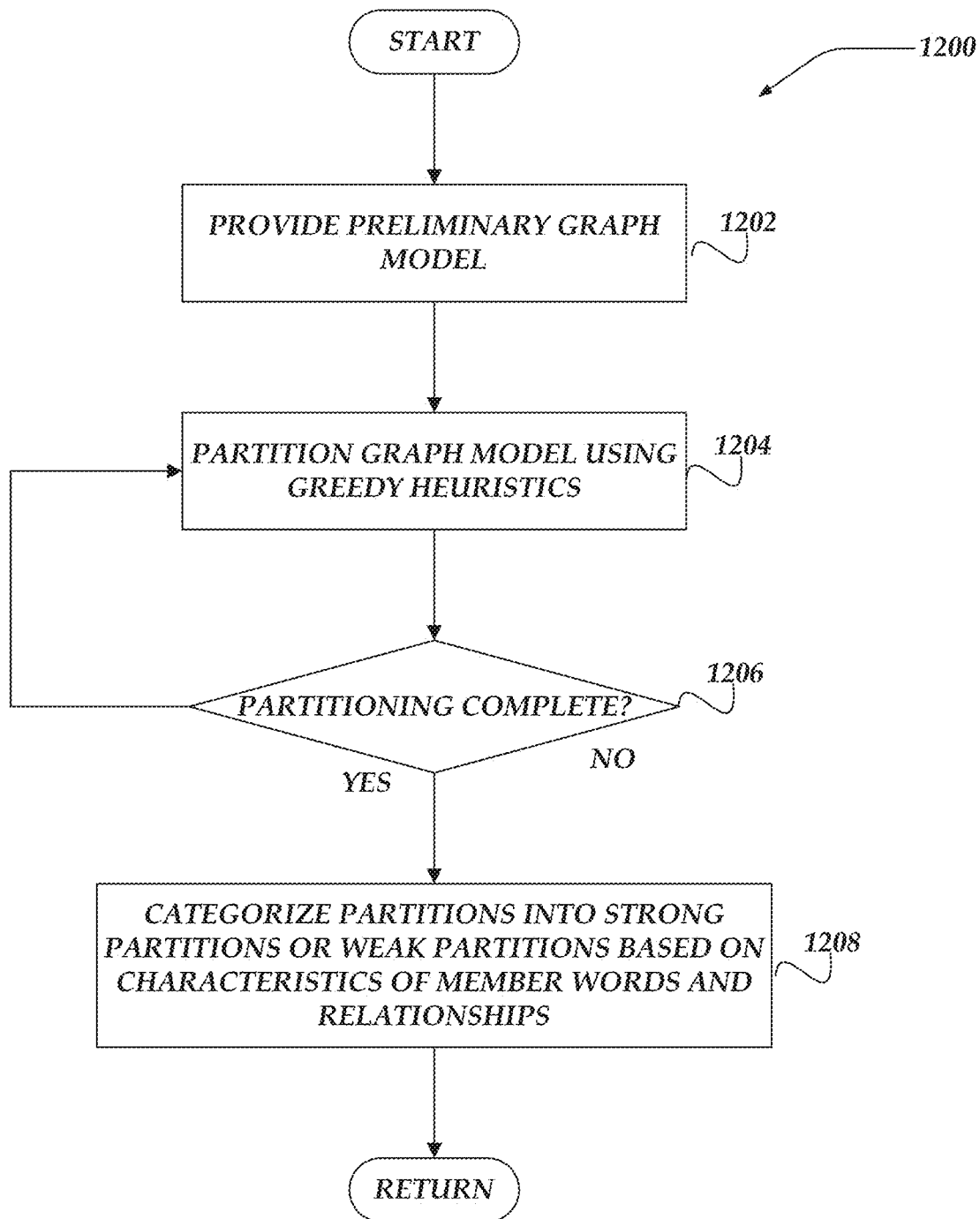
FIG. 12 illustrates a flowchart for a process for partitioning conversation graph models for determining conversational structure from speech in accordance with one or more of the various embodiments.

FIG. 12 illustrates a flowchart for process 1200 for partitioning conversation graph models for determining conversational structure from speech in accordance with one or more of the various embodiments. After a start block, at block 1202, in one or more of the various embodiments, a conversation graph model may be provided to a modeling engine. As described above, in one or more of the various embodiments, modeling engines may be arranged to generate a conversation graph model as words may be provided from a conversation source. In some embodiments, the graph model may represent a snapshot of a pending conversation because the graph model for a conversation may be continuously updated as conversation words may be processed.

At block 1204, in one or more of the various embodiments, the modeling engine may be arranged to partition the graph model using one or more partitioning strategies. In one or more of the various embodiments, partitioning strategies may include one or more rules, heuristics, conditions, classifiers, or the like, that may be employed to partition the conversation graph models into two or more partitions. Accordingly, in some embodiments, conversation words represented by nodes in the graph model may be grouped or clustered based on the partitioning strategy.

In one or more of the various embodiments, partitioning models may be arranged to employ one or more characteristics of the individual word nodes, edges, or the like, to partition the graph model. In some embodiments, the partitioning may be directed towards identifying noise words or noise phrases to separate them from more meaningful portions of the conversation.

In some embodiments, modeling engines may be arranged to employ partition strategies based on one or more conventional or customized graph partitioning methodologies. In some embodiments, the particular methodologies may be determined based on configuration information to account for local requirements or local circumstances. For example, in some embodiments, one or more clustering methodologies may be preferred over another based on available hardware resources, performance requirements, availability of external services, or the like.

For example, in some embodiments, a modeling engine may be arranged to employ Louvian community detection to partition the graph model into relevant portions of a conversation from portions of the conversation that may not represent meaningful concepts. Accordingly, in some embodiments, the strength of the relationship between the nodes in the graph model may be employed as a weighting factor for partitioning the graph model. As described above, in some embodiments, modeling engines may be arranged to determine one or more attributes based on the characteristics of the words or conversation that may be employed to compute a strength of relationship for each edge in the graph model. This strength of relationship score may be employed for partitioning the graph model.

At decision block 1206, in one or more of the various embodiments, if the partitioning is complete, control may flow block 1208; otherwise, control may loop back to block 1204.

At block 1208, in one or more of the various embodiments, the modeling engine may be arranged to categorize the one or more partitions into strong partitions or weak partitions based one or more characteristics of the words and the relationships included in the partitions.

In one or more of the various embodiments, modeling engines may be arranged to determine strong partitions based on the number of strongly related words included in the partition. In some embodiments, modeling engines may be arranged to determine that rules, threshold value, parameters, or the like, for distinguishing strong partitions based on configuration information.

Next, in one or more of the various embodiments, control may be returned to a calling process.

Figure 13:
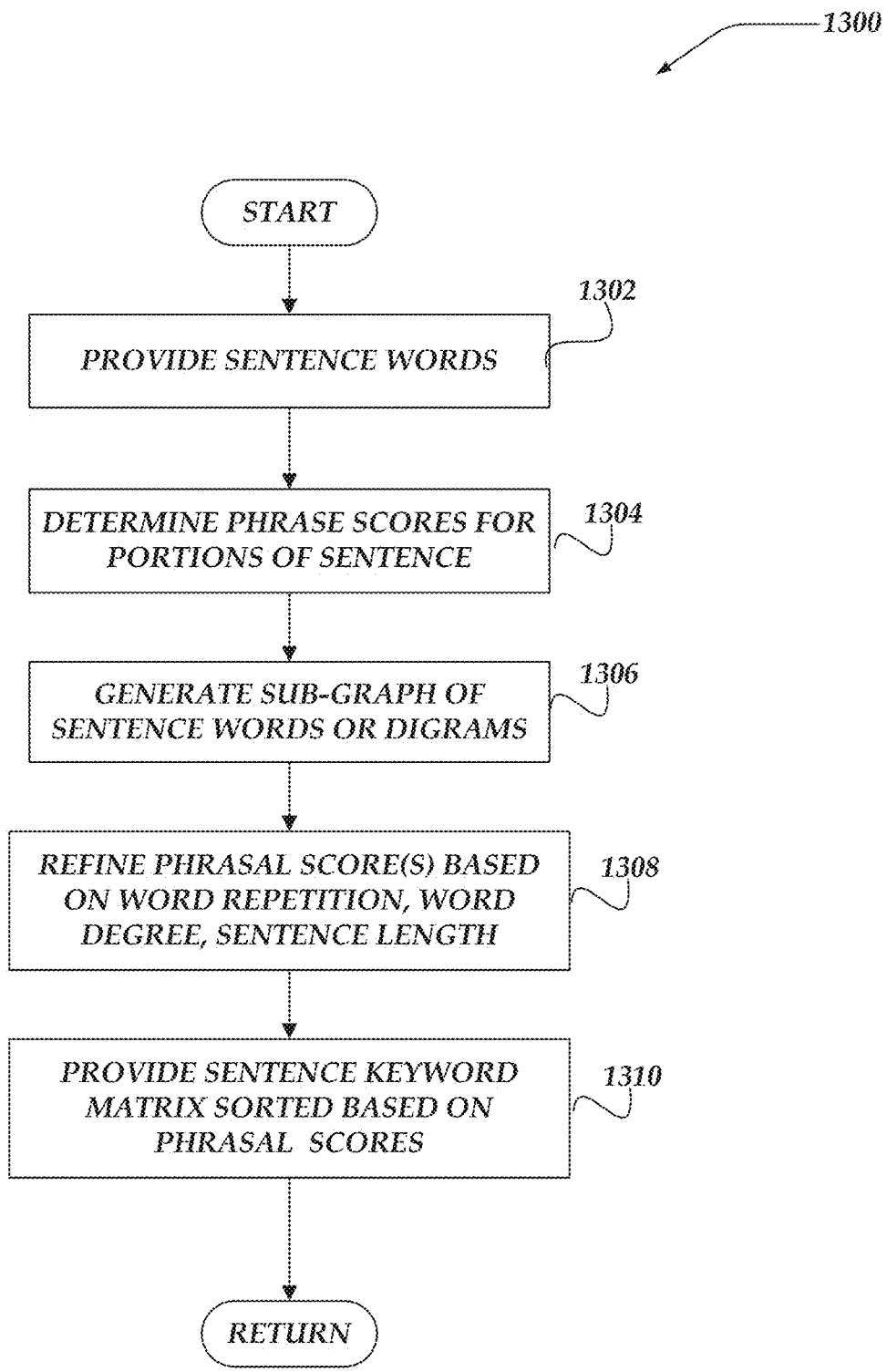
FIG. 13 illustrates a flowchart for a process for generating keyword matrices for sentence models for determining conversational structure from speech in accordance with one or more of the various embodiments.

FIG. 13 illustrates a flowchart for process 1300 for generating keyword matrices for sentence models for determining conversational structure from speech in accordance with one or more of the various embodiments. After a start block, at block 1302, in one or more of the various embodiments, sentence words may be provided to a modeling engine.

In some embodiments, modeling engines may be arranged to monitor the incoming words to determine groups of one or more words that comprise sentences. For example, in one or more of the various embodiments, modeling engines may be arranged to employ natural language processing to determine the conversation words that should be group to provide sentences. Alternatively, in some embodiments, if a speech-to-text service is being used, the speech-to-text service may provide meta-data information, such as, tags, markers, labels, or the like, that may indicate the start or stop of sentences. Further, in some embodiments, entire conversation sentences may be provided via one or more other services that may provide entire sentences. Also, in some embodiments, modeling engines may be arranged to queue or cache incoming conversation words until an entire sentence may be collected.

Note, in some embodiments, processes, such as process 1300 may be arranged to collect sentence words while other processes, such as, process 1100, 1200, or the like, may be concurrently generating or updating conversation graph models, or the like.

In one or more of the various embodiments, modeling engines may be arranged to exclude one or more sentences from modeling. Accordingly, in some cases, one or more sentences may be excluded from this process based on filters or other rules. In some embodiments, the excluded sentences may be sentences that may be recognized or processed using specialized pattern matching, classifiers, or the like. For example, sentences that include acknowledgment phrases, no phrases (e.g., single words), location addresses, phone numbers, or the like, may be automatically excluded from modeling.

At block 1304, in one or more of the various embodiments, modeling engines may be arranged to employ one or more phrase scoring models to determine phrase scores for the digrams included in a sentence. In some embodiments, phrase scoring models may include one or more rules, heuristics, conditions, classifiers, or the like, that may be employed associate phrase scores with each of the digrams included conversation sentences. For example, in some embodiments, modeling engines may be arranged to determine phrase scores based on one or more of repetition count of digrams in a sentence, word degree, length of the digram scaled based on the word degree of the entire sentence, or the like.

In some embodiments, modeling engines may be arranged to generate phrasal scores based on creating a subgraph of the entire sentence. In some embodiments, the sentence may be split and disconnected by stopwords and contiguous blocks of digrams may be ranked on one or more features, such as, repetition of the digrams in the entire sentence, word-degree, length of the entire phrase scaled with respect to the word degree in the entire sentence. In some embodiments, modeling engines may be arranged to determine the particular phrase scoring models to employ based on configuration information.

At block 1306, in one or more of the various embodiments, the modeling engine may be arranged to determine phrase scores for the words included in the sentence based the determined phrase scoring model. In some embodiments, the specific actions performed by the modeling engine may vary depending on the phrase scoring model.

For example, in some embodiments, the modeling engine may be arranged to generate a sub-graph model that represents the one or more sentence words. In some embodiments, stop-words, or the like, may be omitted from consideration. Accordingly, in some embodiments, each digram in the sentence under consideration may be associated with a node in the sub-graph. Also, in some embodiments, edges may be determined to connect the sub-graph nodes with each based on words that are shared between the different digrams in the sentence. Note, in some embodiments, modeling engines may be arranged to employ one or more conventional or custom data structures to represent sub-graph or its nodes or edges, such as, arrays, linked lists, tables, matrices, or the like. Next, in some embodiments, a word-degree score may be generated for each digram based on the number of edges associated with the node representing a given digram.

At block 1308, in some embodiments, phrase scoring may be further refined by determining a frequency score for each digram based on the number of times the digram may be repeated in the same sentence. In some embodiments, the phrase score may be further refined by dividing the word-degree by the frequency score. One of ordinary skill in the art will appreciate that other phrase scoring methodologies may be employed depending on local requirements or local circumstances. For example, in some embodiments, the specialized hardware support, or the like, may dictate that other phrase scoring techniques may be employed. Likewise, in some embodiments, two or more phrase scoring models may be employed such that their performance may be compared or evaluated against each other.

In one or more of the various embodiments, sentence words may be processed as pairs (e.g., word digrams) to determine phrase scores for each digram in the sentence. In some embodiments, modeling engines may be arranged to exempt or exclude one or more words that may be determined to provide little or no semantic value. In some embodiments, the particular words that may be excluded from the phrase scoring process may vary depending on the natural language, organizational preferences, user preferences, problem domain considerations, or the like. Accordingly, in some embodiments, modeling engines may be arranged to employ rules, dictionaries, catalogs, taxonomies, ontologies, parsers, grammars, or the like, that may be provided or based on configuration information to account for local requirements or local circumstances. For example, in some embodiments, words, such as, 'the', 'of', 'be', 'is', or the like, may be excluded from some or all portions of the phrase scoring. However, in some embodiments, modeling engines may be arranged to employ or consider the exempt words while evaluating other phrases. For example, in some embodiments, if phrase scoring includes total word count or length of a sentence, in some embodiments, the exempt words may be included. Further, in some embodiments, some or all of the exempt words may be considered stop words that may be defined as a list or collection of stop words.

In one or more of the various embodiments, modeling engines may be arranged to identify subjects and objects in the sub-graph. In some embodiment, modeling engines may be arranged to associate candidate phrases with the subject and object using the left and right child of the verb associated with the main subject of the sentence. In some embodiments, modeling engines may be arranged to search for matching subject/object pairs in conversation graph partitions and associate a partition with each subject/object pair.

At block 1310, in one or more of the various embodiments, the modeling engine may be arranged to provide one or more sentence keywords rank ordered based on the phrase scores.

Further, in some embodiments, modeling engines may be arranged to include the combination of partition words and keywords, such as, [p1_word, p2_word] [key word], [p1_word, p2_word] [key word], or the like, in sentence models.

Figure 14:
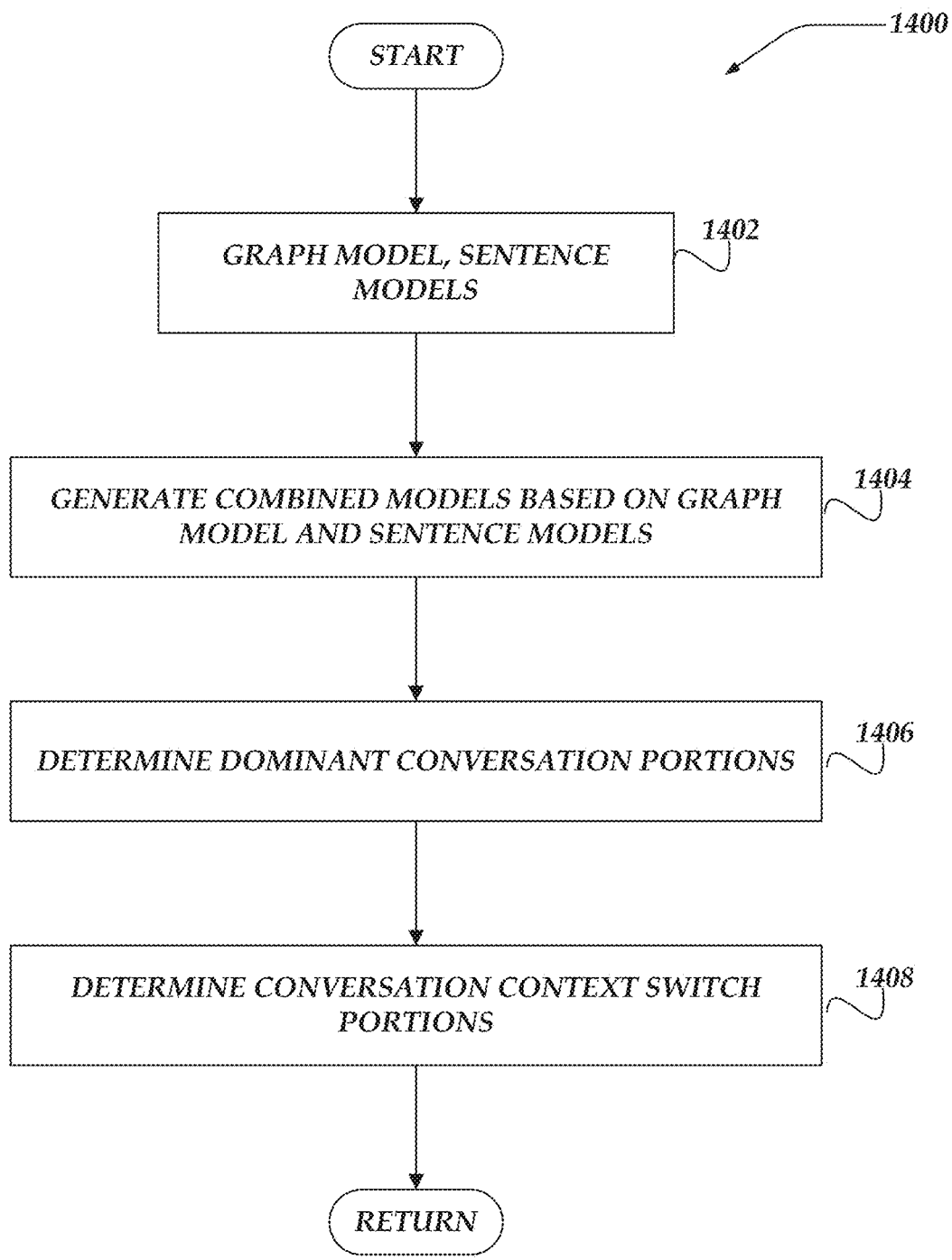
FIG. 14 illustrates a flowchart for a process for generating combined model matrices for determining conversational structure from speech in accordance with one or more of the various embodiments.

FIG. 14 illustrates a flowchart for process 1400 for generating combined model matrices for determining conversational structure from speech in accordance with one or more of the various embodiments. After a start block, at block 1402, in one or more of the various embodiments, one or more sentence models, and a graph model may be provided to a modeling engine. As described above, in some embodiments, modeling engines may be arranged to generate or determine one or more key phrases, one or more sentence models, and a graph model that represents the features or characteristics of a conversation. In some embodiments, modeling engines may be provided references or identifiers that may be employed to lookup or retrieve one or more data structures that may represent the one or more key phrases, one or more sentence models, or the graph model.

At block 1404, in one or more of the various embodiments, the modeling engine may be arranged to generate a combined model for the conversation based on sentence models and the graph model. Accordingly, in some embodiments, the modeling engines may be arranged to employ the combined model to generate a conversation digest that may be used to trace topic transitions in the flow of the conversation.

In one or more of the various embodiments, combined models may include records or attributes that may be associated with time-line information. Accordingly, the time-line information may be employed to associate information from the one or more key phrases, the one or more sentence models, or the graph model with their corresponding position in the conversation. For example, key phrases determined from sentence models may be associated with conversation partitions that correspond to the same time/portion of the conversation. For example, in some embodiments, modeling engines may be arranged to generate matrices that combine the information from sentence models and conversation partitions where the rows of the matrices may correspond to the time-line position of the conversations and columns in the matrices may correspond to attribute values associated with the one or more key phrases, the one or more sentence models, or the graph model partitions.

In one or more of the various embodiments, modeling engines may be arranged to map key phrases in sentence models to partitions by iterating through the rank ordered key phrases in sentence models to determine the partitions they may be strongly correlated with. In some embodiments, modeling engines may be arranged employ one or more methods to determine the correlation strength. Thus, in some embodiments, the rules or features for determining the correlations may be modified or customized depending on local requirements or local circumstances. For example, in some embodiments, modeling engines may be arranged to combine the partitions from the graph model and the sentence models into multi-dimensional matrices. In some embodiments, these matrices may be reduced by conventional decomposition, or the like. And, in this example, eigen vectors of the decomposed matrices may be determined. Thus, in this example, modeling engines may be arranged to determine the strength of the correlation between key phrases in sentences and the conversation partitions based on their associated eigen values.

In one or more of the various embodiments, modeling engines to generate combined models by combining a representation of the graph model (the partitions) and the sentence models into one combined model. In some embodiments, modeling engines may be arranged to represent combined models using matrix data structures.

At block 1406, in one or more of the various embodiments, the modeling engine may be arranged to determine one or more dominant conversation portions based on the combined model. In some embodiments, modeling engines may be arranged to employ the combined model to determine the partitions that are strongly associated with key phrases from the sentence models.

In one or more of the various embodiments, partitions that may be strongly associated with key phrases in sentence models may be determined to be dominant portions of the conversation.

In one or more of the various embodiments, modeling engines may be arranged to represent the importance of each word or phrase in a partition using a distribution curve such that the peak of the curve may correspond to the contextual importance of words or words in partitions.

At block 1408, in one or more of the various embodiments, the modeling engine may be arranged to determine one or more conversation context switch portions of the conversation based on the one or more key-phrases, one or more word nodes, one or more sentence models, or the like. In some embodiments, modeling engines may be arranged to determine context switch portions of the conversations based on evaluating the dips/crests in the distribution curves included in a conversation digest.

In one or more of the various embodiments, modeling engines may be arranged to evaluate one or more characteristics of the contextual importance curves to determine where a dominant portion of the conversation ends and another begins. For example, in some embodiments, modeling engines may be arranged evaluate the maximum value, minimum values, rate of change, direction of change, rolling averages, or the like, of a distribution curves associated with a portion of a conversation to determine if the subject/context of the conversation may be shifting.

In one or more of the various embodiments, a conversation digest (See, conversation digest 412 in FIG. 4) may be generated based on the dominant portions of the conversation and the non-dominant portions that may link the dominant portions of the conversation together. In some embodiments, non-dominant portions of the conversation may be considered context transitions that represent how the conversation transitions from topic to another.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrative Logical System Architecture for Determining Topics and Action

Figure 15:
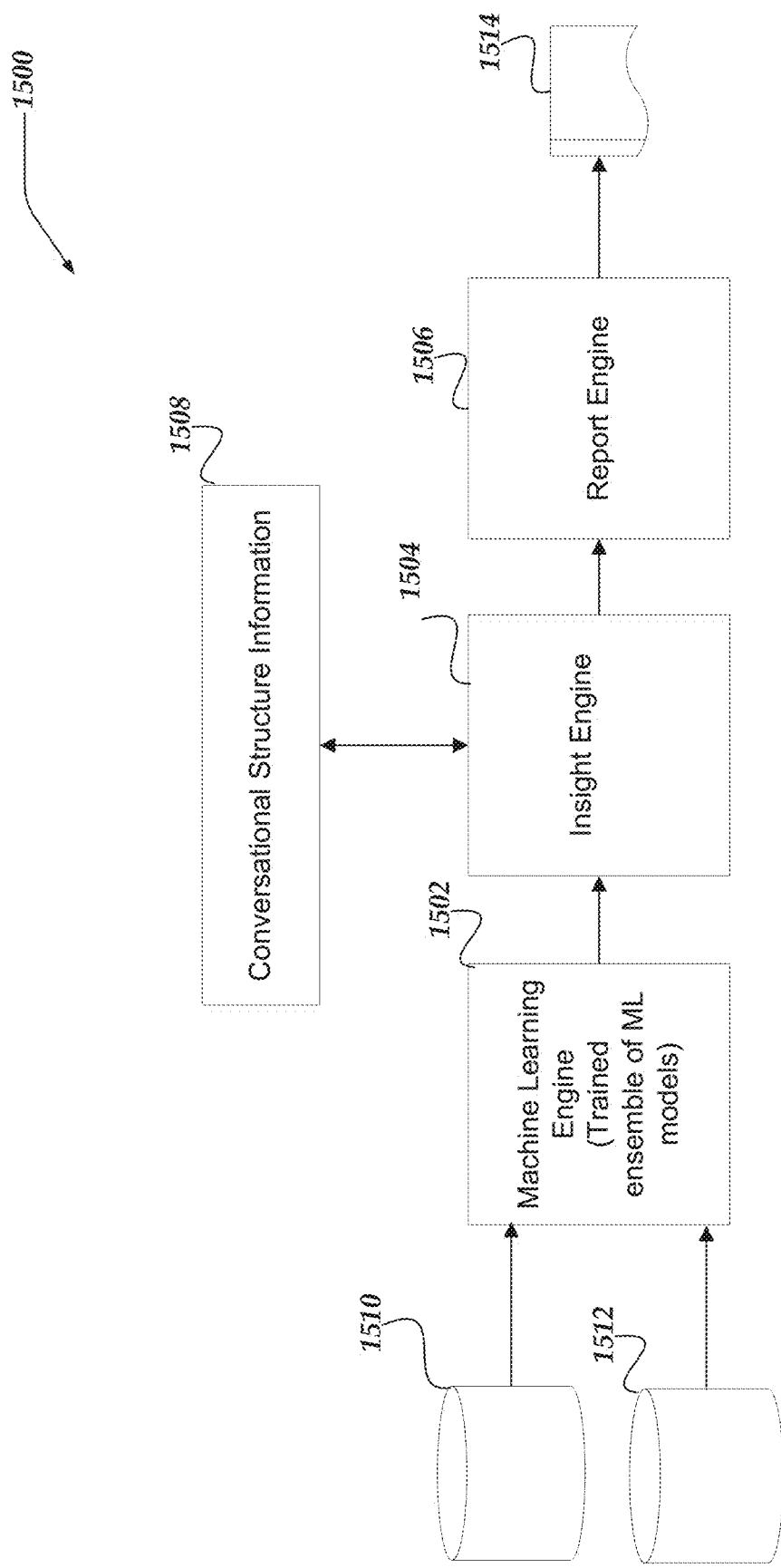
FIG. 15 illustrates a logical schematic of a portion of a system for determining topics and action items from conversations in accordance with one or more of the various embodiments.

FIG. 15 illustrates a logical schematic of a portion of system 1500 for determining topics and action items from conversations in accordance with one or more of the various embodiments. In one or more of the various embodiments, speech analysis platforms may be arranged to enable interactive reports that enable users to identify various topics that may be have discussed in a conversation. Accordingly, in some embodiments, such reports may enable users to navigate to identified topics similar to how interactive outlines for documents enable readers to navigate to different parts of the documents.

Also, in some embodiments, speech analysis platforms may be arranged to identify action items that may have come up in the conversation. In some embodiments, action items may include discussions about starting tasks, making appointments, plans to make a call or send an email, or the like. For example, if a speaker in a conversation says "I will need to follow up with Jane to discuss Project Unicorn", speech analysis platforms may determine that the conversation produces at least one action item, following up with Jane about Project Unicorn.

In one or more of the various embodiments, speech analysis platforms may be arranged to identify tasks or action items as well as if someone has taken responsibility for the tasks or action items. Thus, in some embodiments, speech analysis platforms may be arranged to determine unclaimed action items and claimed action items (open action items). Likewise, in one or more of the various embodiments, speech analysis platforms may be arranged to identify closed or completed items based on analyzing the conversation.

In one or more of the various embodiments, speech analysis platforms, such as, system 1500 may be arranged to include various components, including, machine learning engine 1502, analysis engine 1504, insight engine 1506, conversation structure information 1508, source conversation data 1510, training conversation data 1512, insight report(s) 1514, or the like.

In one or more of the various embodiments, machine learning engines, such as, machine learning engine 1502 may be arranged to include an ensemble of trained machine learning models that may be used to determine candidate topics or action items in speech. In some embodiments, machine learning engine may be arranged to determine the one or more portions of a conversation that may include action items or topics. In some embodiments, the one or more portions of the conversation determined by machine learning engine 1502 may be portions of the conversation that have a significant probability of including action items or topics.

In one or more of the various embodiments, analysis engines, such as, analysis engine 1504 may be arranged to perform additional analysis on the portions of conversations determined by machine learning engine 1502 to determine if the portions do include action items or topics. In some embodiments, analysis engines may be arranged to employ rules or heuristics to clarify if the portions of the conversation determined by machine learning engine 1502 include action items or topics. In some embodiments, analysis engine 1504 may be arranged to employ rules that incorporate conversational structure information 1508 into the analysis. For example, for some embodiments, conversation structure information 1508 may be used to confirm if a potential action item is included in dominant portion of the conversation which may increase the confidence that the potential action item is an actual action item.

In one or more of the various embodiments, insight engine 1506 may be arranged to provide one or more interactive reports, APIs, interfaces, or the like, that may enable users to employ the one or more insights discovered by analysis engine 1504. In some embodiments, insight engine 1506 may be arranged to enable users or other services access to the source conversation associated with the one or more insights. For example, if the one or more insights include one or more topics determined from the source conversation, insight engine 1506 may provide interactive reports (e.g., user interfaces) that enable the portions of the source conversation to be viewed by selecting a topic links, or the like.

Figure 16:
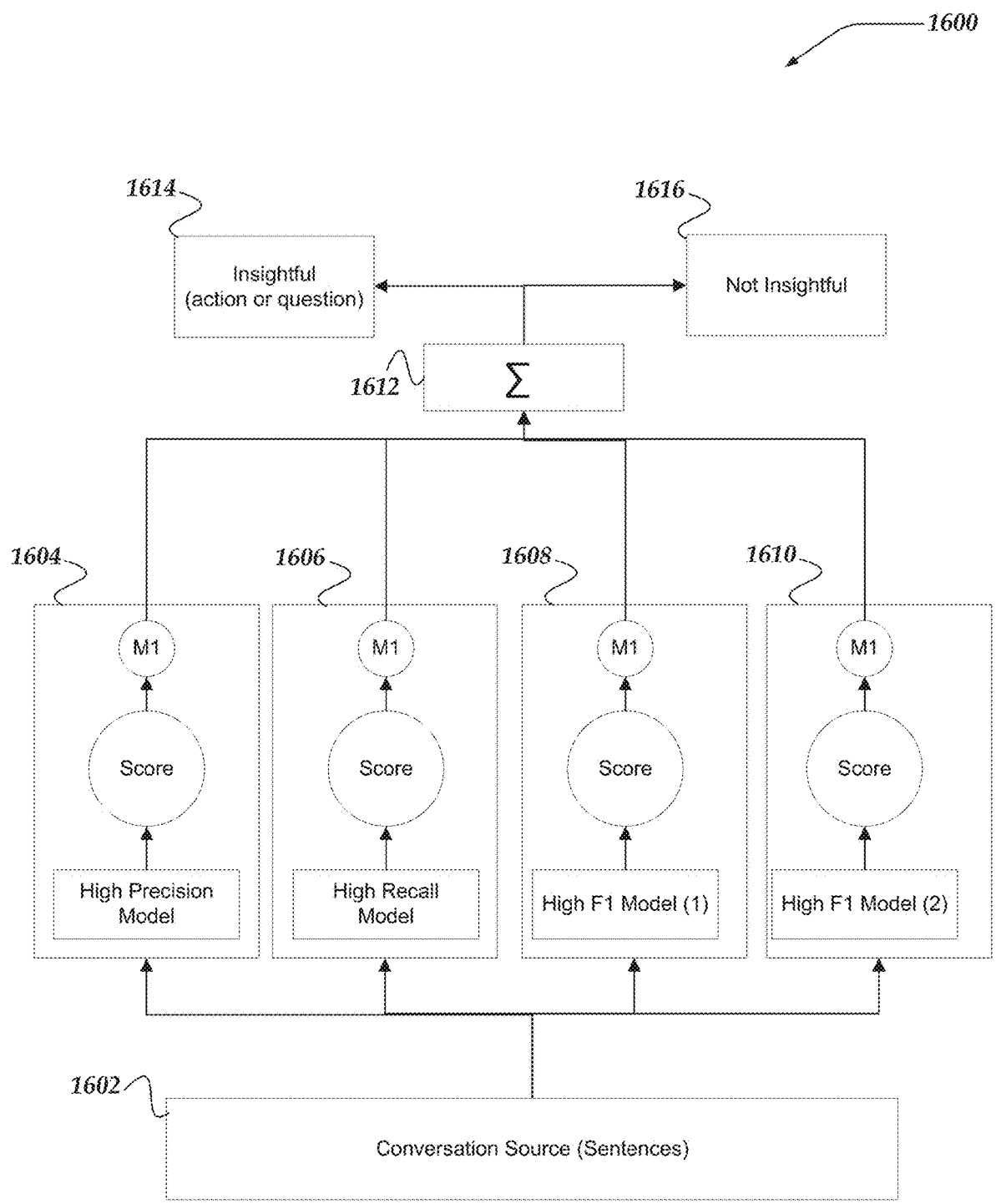
FIG. 16 illustrates a logical schematic of a machine learning engine for determining topics and action items from conversations in accordance with one or more of the various embodiments.

FIG. 16 illustrates a logical schematic of machine learning engine 1600 for determining topics and action items from conversations in accordance with one or more of the various embodiments. In one or more of the various embodiments, machine learning engines, such as, machine learning engine 1600 may be arranged to include various components, including conversation source 1602, machine learning model 1604, machine learning model 1606, machine learning model 1608, machine learning model 1610, concentrator 1612, action bucket 1614, no-action bucket 1616, or the like.

In one or more of the various embodiments, speech analysis platforms may be arranged to process conversations from various sources, subjects, domains, or the like. In one or more of the various embodiments, speech analysis platforms may be arranged to process natural speech from conversations from meetings, teleconferences, speeches, presentations, multi-party conversations, or the like. Accordingly, in one or more of the various embodiments, speech analysis platforms may be arranged to handle a wide-variety of conversation subjects including subjects unrelated to the main subject of the conversation. For example, meeting on a technical subject may be dominated by speech associated with the technical subject matter. However, in this example, one or more portions of the conversation may also include unrelated subject matter, such as, social niceties, discussions about the weather, tangential side-topics, administrative subjects related to running the meeting, or the like.

Further, in one or more of the various embodiments, organizations may conduct many meetings covering many different subjects. Accordingly, in some embodiments, speech analysis platforms may be required to process many types of subjects or domains within the same organization. Thus, in some embodiments, conventional machine learning that may rely on supervised training of models or classifiers may be disadvantageous because of the challenges associated with training machine learning models for each specific subject or problem. For example, in some cases, training models may be time consuming or expensive. Plus, in some cases it may be difficult to collect the training data required to train models for each encountered subject. Also, in some cases, conversations may naturally bounce around between many subjects making it difficult to provide machine learning models that are trained for all the subjects that may come up in a conversation. Further, in some cases, unexpected subjects may naturally come up in conversations such that there may not be machine learning model trained for the unexpected subject.

Accordingly, in one or more of the various embodiments, machine learning engines may be arranged to include an ensemble of trained machine learning models that may be used in combination to tentatively determine the portions of a source conversation that may include words or languages associated with action items or topics. In some embodiments, ensemble of machine learning models may include two or more machine learning models that are adversarial or otherwise competitive.

Further, in some embodiments, each machine learning model may be trained on the same training data. However, in some embodiments, the antagonistic or competitive machine learning models may be arranged to observe the training results of their competitive counterparts. Thus, in some embodiments, training input to the machine learning models may include the results of one or more other machine learning models being trained with the same data.

In one or more of the various embodiments, machine learning engines may be arranged to employ machine learning model ensembles that include more or fewer machine learning models that as shown here.

In this example: machine learning model 1604 may be considered a high precision model; machine learning model 1606 may be considered a high recall model; machine learning model 1608 may be considered an F1 scoring model; machine learning model 1610 may be considered a high precision model; or the like.

Figure 17:
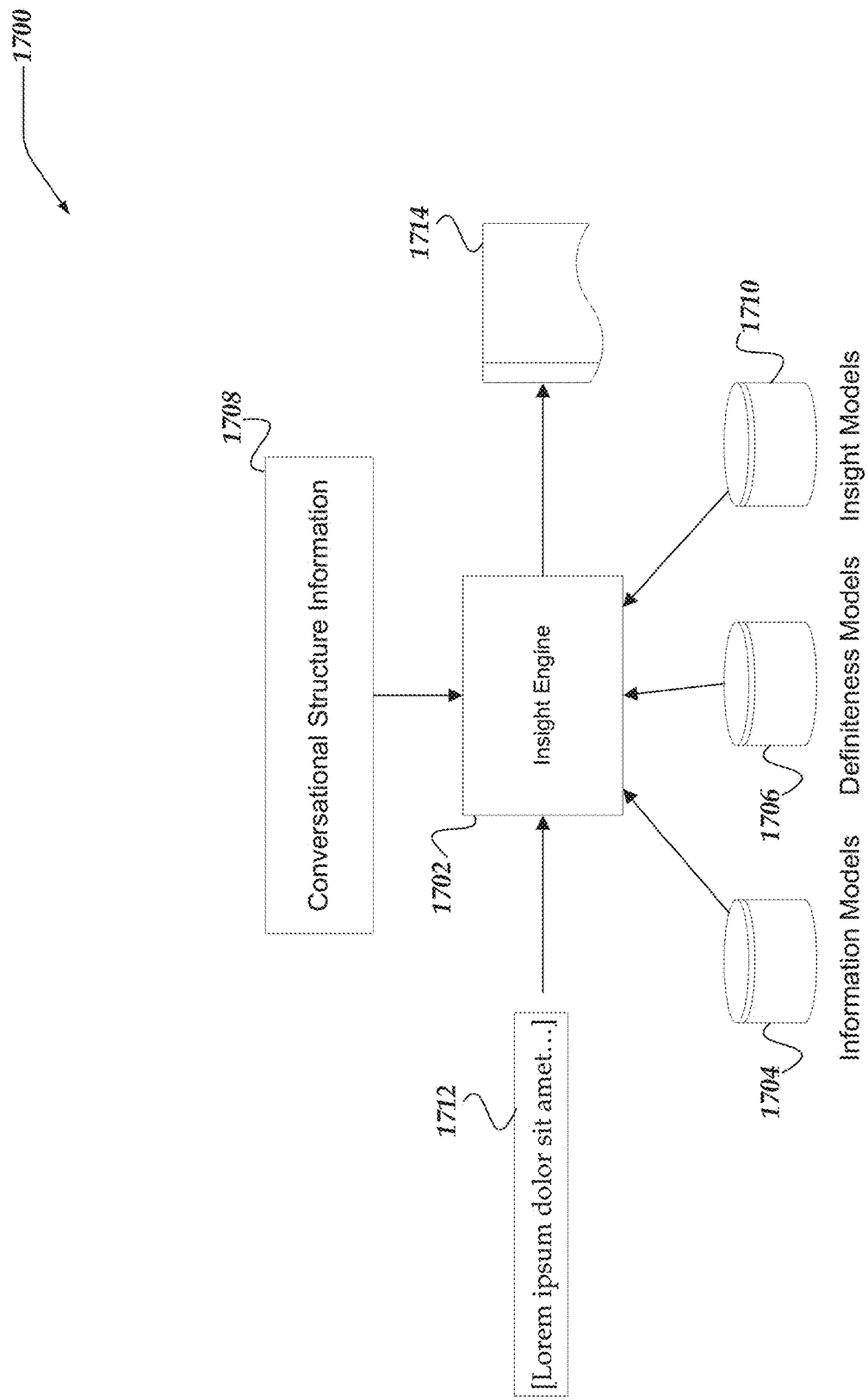
FIG. 17 illustrates a logical architecture of a system for determining topics and action items from conversations in accordance with one or more of the various embodiments.

FIG. 17 illustrates a logical architecture of system 1700 for determining topics and action items from conversations in accordance with one or more of the various embodiments. In one or more of the various embodiments, system 1700 may be hosted or executed by one network computers, such as, speech analysis server computer 116, or the like. In one or more of the various embodiments, system 1700 may include: insight engine 1702, information models 1704, definiteness models 1706, conversational structure information 1708, insight models 1710, or the like. Accordingly, in some embodiments, input information, such as, inputs 1712 may be provided to insight engine 1702 to generate insight scores, such as, insight score 1714 for sentences included in inputs 1712.

In one or more of the various embodiments, insight engines may be arranged to employ one or more information models to generate information scores for sentences. In some embodiments, information models may be considered data structures that include heuristics, classifiers, rules, instructions, or the like, that may be employed to generate an information score for a sentence. In some embodiments, information models may be modified by insight engines based on various inputs, rules, or the like.

Also, in one or more of the various embodiments, insight engines may be arranged to employ one or more definiteness models to generate definiteness scores for sentences. In some embodiments, definiteness models may be considered data structures that include heuristics, classifiers, rules, instructions, or the like, that may be employed to compute the definiteness score.

In one or more of the various embodiments, insight engines may be arranged to employ one or more insight models to generate insights (e.g., actions, questions, or the like) from conversations. In one or more of the various embodiments, insight models may be arranged to include the rules or instructions for mapping insightful sentences to specific insights that may be provided in an interactive report to users. In some embodiments, insight models may be arranged to include one or more cleanup actions such as filtering extra words, adjusting grammar, adjusting punctuation, or the like.

Figure 18:
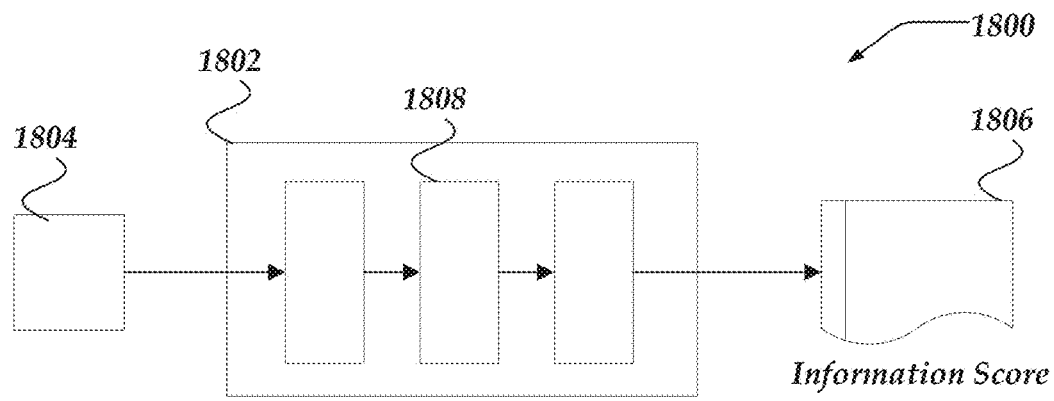
FIG. 18 illustrates a logical schematic of a portion of an insight engine showing information models, definiteness models, and insight models for determining topics and action items from conversations in accordance with one or more of the various embodiments.
Figure 18:
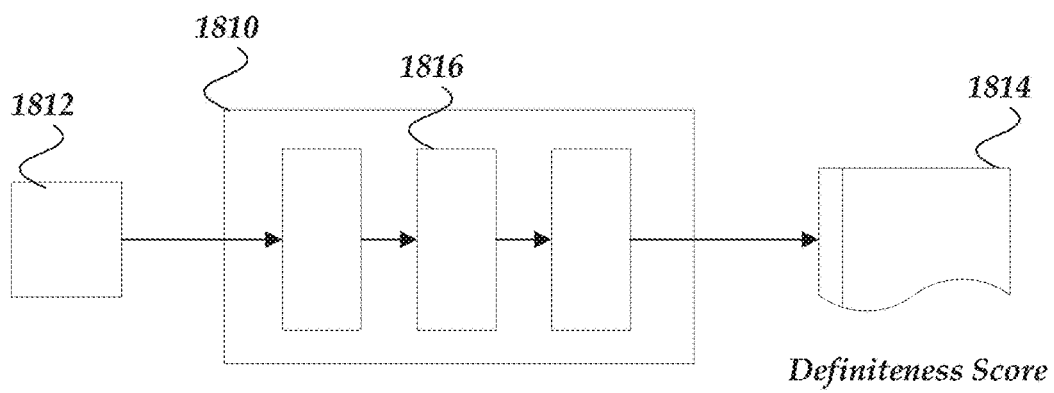
Figure 18:
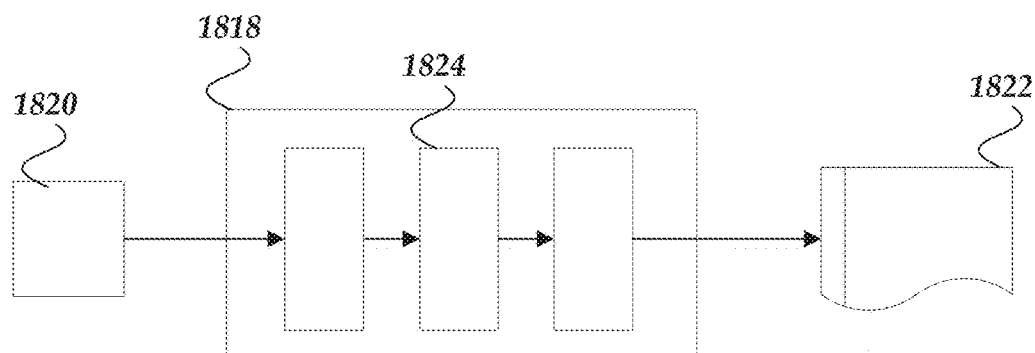

FIG. 18 illustrates a logical schematic of a portion of insight engine 1800 showing information models, definiteness models, and insight models for determining topics and action items from conversations in accordance with one or more of the various embodiments.

In some embodiments, insight engines may be arranged to employ information models, such as, information model 1802 to determine information scores for sentences that have been determined to be insightful by a machine learning engine. Information models may encapsulate various rules, instructions, classifiers, or the like, that may be employed to produce am information score for a sentence. In some embodiments, the particular components or configuration of an information model may vary depending on local requirements or local circumstances. In some embodiments, insight engines may be arranged to employ different information models for determining different types of insights, such as, topics, appointments, action items, speaker identification/ correlation, or the like. Accordingly, in some embodiments, insight engines may be arranged to employ rules, instructions, conditions, or the like provided via configuration information to determine which information model should be used.

In some embodiments, information models may be arranged to accept inputs 1804, such as, sentences, conversational structure information, or the like. In some embodiments, information models may be arranged to process the inputs to generate information scores, such as, information score 1806 for sentences. In some embodiments, rules, libraries, or the like, for determining information scores be encapsulated in information models. In this example, component 1808, or the like, may represent the internal implementation of information model 1802. Note, while the illustration of this example may resemble a pipeline architecture, these innovations are not so limited because other solutions or architectures may be employed as well.

In this example, for some embodiments, insight engines may be arranged to provide input information 1804 to information model 1802. Accordingly, in some embodiments, one or more parts of information model 1802, such as, component 1808 may evaluate input information 1804 to generate information score 1806 for the sentence.

In one or more of the various embodiments, information scores may be comprised of a variety of measurements of one or more features or characteristics of a sentence. In some embodiments, such features or characteristics may include, speaker identity, number or type of subject words, number or type of object words, number or type of action words, number or type of question words, number of related actions/questions in sentence, or the like.

Also, in some embodiments, insight engines may be arranged to employ definiteness models, such as, definiteness model 1810 to generate a definiteness score for sentences. In some embodiments, definiteness models may encapsulate the various heuristics, rules, conditions, classifiers, or the like, generating a definiteness score. In some embodiments, the particular components or configuration of a definiteness model may vary depending on local requirements or local circumstances. In some embodiments, insight engines may be arranged to employ different definiteness models for determining different types of insights, such as, topics, appointments, action items, speaker identification/ correlation, or the like. Accordingly, in some embodiments, insight engines may be arranged to employ rules, instructions, conditions, or the like, provided via configuration information to determine which definiteness model should be used.

Similar to information models, in some embodiments, definiteness models may be arranged to accept inputs 1812, such as, sentences, conversational structure information, or the like. In some embodiments, definiteness models may be arranged to process the inputs to generate definiteness scores, such as, definiteness score 1814 for sentences. In some embodiments, rules, libraries, or the like, for determining definiteness scores to be encapsulated into definiteness models. In this example, component 1816, or the like, may represent the internal implementation of definiteness model 1810. Note, while the illustration of this example may resemble a pipeline architecture, these innovations are not so limited because other solutions or architectures may be employed as well.

Further, in some embodiments, insight engines may be arranged to employ insight models, such as, insight model 1818 to generate the specific insights and their representation (e.g., labels, descriptions, text content, or the like) that may be associated with sentences. In some embodiments, insight models may encapsulate the various heuristics, rules, conditions, classifiers, or the like, generating insights. In some embodiments, the particular components or configuration of an insight model may vary depending on local requirements or local circumstances. In some embodiments, insight engines may be arranged to employ different insight models for determining different types of insights, such as, topics, appointments, action items, events, requests, or the like. Accordingly, in some embodiments, insight engines may be arranged to employ rules, instructions, conditions, or the like, provided via configuration information to determine which insight model should be used.

Similar to information models or definiteness models, in some embodiments, insight models may be arranged to accept inputs 1820, such as, sentences, conversational structure information, information scores, definiteness scores, or the like. In some embodiments, insight models may be arranged to process inputs 1820 to generate insights that may be associated with the sentence, such as, insights 1822. In some embodiments, rules, libraries, or the like, for determining insights may be encapsulated into insight models. In this example, component 1824, or the like, may represent the internal implementation of insight model 1824. Note, while the illustration of this example may resemble a pipeline architecture, these innovations are not so limited because other solutions or architectures may be employed as well.

Generalized Operations for Determining Topics and Action Items from Conversations FIGS. 19-22 represent generalized operations for determining topics and action items from conversations in accordance with one or more of the various embodiments. In one or more of the various embodiments, processes 1900, 2000, 2100, and 2200 described in conjunction with FIGS. 19-22 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 19-22 may be used for determining topics and action items from conversations in accordance with at least one of the various embodiments or architectures such as those described in conjunction with FIGS. 4-7 or FIGS. 15-18 Further, in one or more of the various embodiments, some or all of the actions performed by processes 1900, 2000, 2100, and 2200 may be executed in part by modeling engine 322, speech analysis engine 324, insight engine 326, or the like, by one or more processors of one or more network computers.

Figure 19:
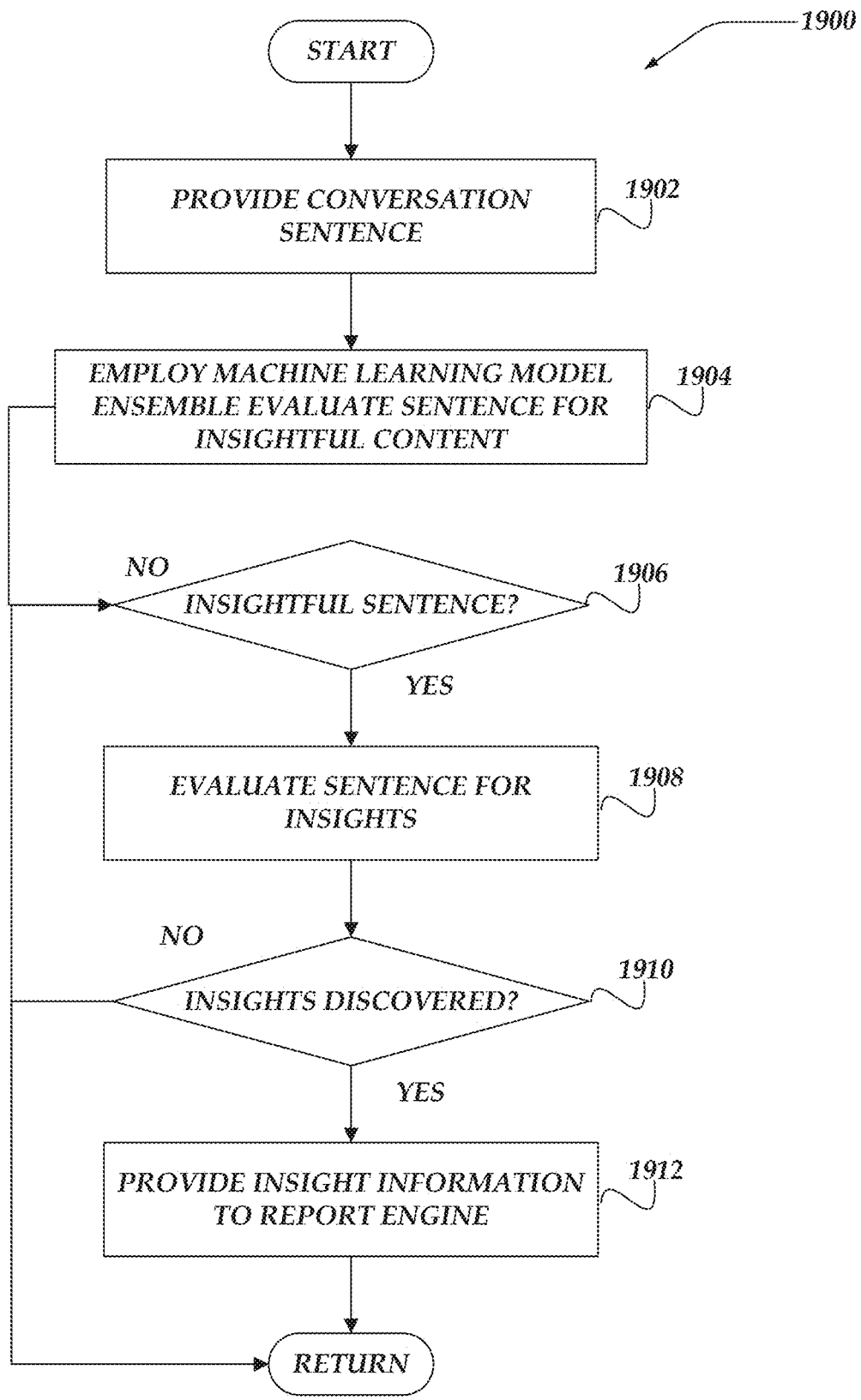
FIG. 19 illustrates an overview flowchart for a process for determining topics and action items from conversations in accordance with one or more of the various embodiments

FIG. 19 illustrates an overview flowchart for process 1900 for determining topics and action items from conversations in accordance with one or more of the various embodiments. After a start block, at block 1902, in one or more of the various embodiments, sentences from a source conversation may be provided to a machine learning engine. As described above, the machine learning engines may include an ensemble of machine learning models.

At block 1904, in one or more of the various embodiments, the machine learning engine may be arranged to employ a machine learning model ensemble to determine if a sentence may include insightful language that may be associated with actions or questions. Accordingly, in some embodiments, machine learning engine may determine insight scores (e.g., action score or question score) for each sentence in a conversation.

At decision block 1906, in one or more of the various embodiments, if sentences may include insight information, control may flow to block 1908; otherwise, control may be returned to a calling process. In one or more of the various embodiments, machine learning engine may be arranged to employ defined threshold values to determine if the insight score associated with a sentence indicate that the sentence may be insightful. In some embodiments, action scores or question scores may be associated with different threshold scores.

At block 1908, in one or more of the various embodiments, an insight engine may be arranged to evaluate the one or more sentences indicated as likely to include insight information to determine the one or more insights, if any, that may be included in each insightful sentence.

At decision block 1910, in one or more of the various embodiments, if insights may be discovered, control may flow to block 1912; otherwise, control may be returned to a calling process.

At block 1912, in one or more of the various embodiments, the insight information associated with the sentences may be provided to a report engine. In one or more of the various embodiments, report engines may be arranged to generate one or more interactive reports or user interface that may enable users to explore or analyze conversations based on the discovered insights. In some embodiments, report engines may be arranged to generate or recommend actions, such as, making appointments, setting reminders, sending notifications, or the like, based on the actions or questions included in one or more of the discovered insights.

Next, in one or more of the various embodiments, control may be returned to a calling process.

Figure 20:
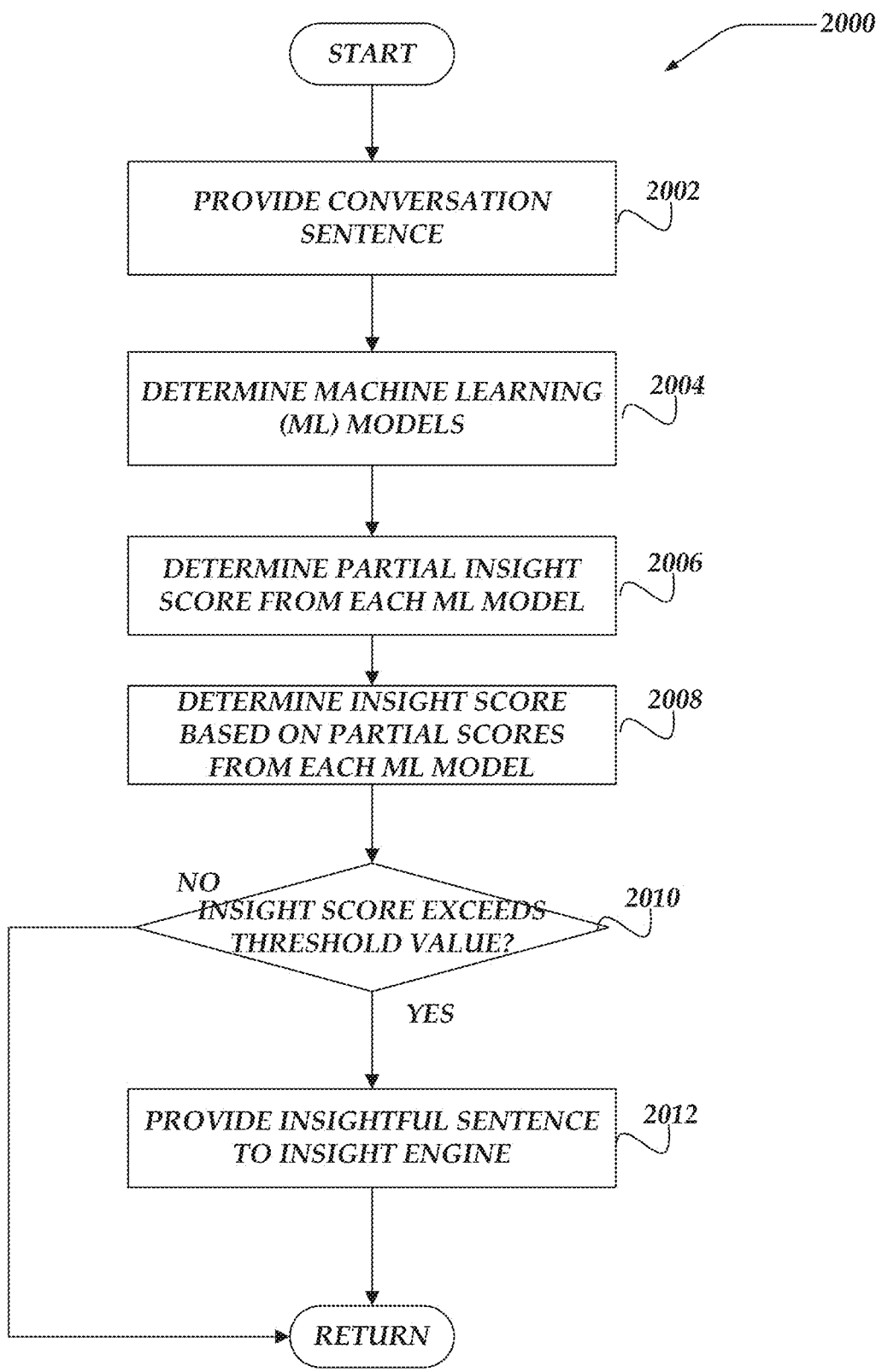
FIG. 20 illustrates a flowchart for a process for determining topics and action items from conversations in accordance with one or more of the various embodiments.

FIG. 20 illustrates a flowchart for process 2000 for determining topics and action items from conversations in accordance with one or more of the various embodiments. After a start block, at block 2002, in one or more of the various embodiments, a sentence from a source conversation may be provided to a machine learning engine. As described above, in some embodiments, sentences from a source conversation may be provided to the machine learning engine. In some embodiments, another service or pre-processors may be employed to group or separate words from a source conversation into sentences.

At block 2004, in one or more of the various embodiments, the machine learning engine may be arranged to determine one or more machine learning models. In one or more of the various embodiments, machine learning engine may be arranged to employ an ensemble of two or more machine learning models to evaluate sentences. In some embodiments, the same machine learning models may be employed for some or all conversations. However, in some embodiments, machine learning engines may be arranged to select the machine learning models for an ensemble based on one or more characteristics of the source conversation, such as, subject matter domain, organizational preferences, user preferences, language, local/cultural considerations, or the like. Accordingly, in some embodiments, machine learning engines may be arranged to employ rules, instructions, or the like, provided via configuration information to determine the machine learning models for the ensemble.

At block 2006, in one or more of the various embodiments, the machine learning engine may be arranged to determine one or more partial insight scores for each machine learning model based on the sentence. As described above, each machine learning model included in the ensemble may generate partial insight scores for each sentence.

In one or more of the various embodiments, insight scores may be associated with the likelihood that a sentence includes action information or question information. Accordingly, in some embodiments, insight scores may be comprised of action scores or question scores. In some embodiments, action scores reflect that a sentence may be correlated with actions, such as, setting appointments, assigning resources, resolving open items, action items, or the like. Similarly, in some embodiments, question scores reflect that a sentence may be correlated with questions, follow ups, unanswered queries, or the like. In some embodiments, action score or question scores may be distinct. Further, in some embodiments, one or more sentences may be associated with both action score or question scores. Likewise, in some embodiments, one or more sentences may be associated with one type of score and not the other. However, for brevity and clarity both types of scores may be referred to as insight scores.

At block 2008, in one or more of the various embodiments, the machine learning engine may be arranged to generate an insight score for the sentence based on the one or more partial insight scores. In some embodiments, machine learning engine may be arranged to combine partial insight scores into an overall score for the sentence. In some embodiments, partial scores provided by different models may be weighted differently depending on configuration information.

At decision block 2010, in one or more of the various embodiments, if the insight score for a sentence exceeds a threshold value, control may flow to block 2012; otherwise, control may be returned to a calling process.

At block 2012, in one or more of the various embodiments, the machine learning engine may be arranged to provide the sentence to an insight engine for further processing. In one or more of the various embodiments, sentences associated with insight scores (e.g., action scores, question scores, or both) that exceed a defined threshold value may be considered to be insightful sentences because they may be likely to include insights. Accordingly, in some embodiments, machine learning engine may be arranged to separate sentences into two categories, insightful and not insightful where insightful sentences may be further categorized into action sentences, question sentences, hybrid sentences. In some embodiments, hybrid sentences may be considered to be sentences associated with action scores and question scores that both exceed a threshold value.

Next, in one or more of the various embodiments, control may be returned to a calling process.

Figure 21:
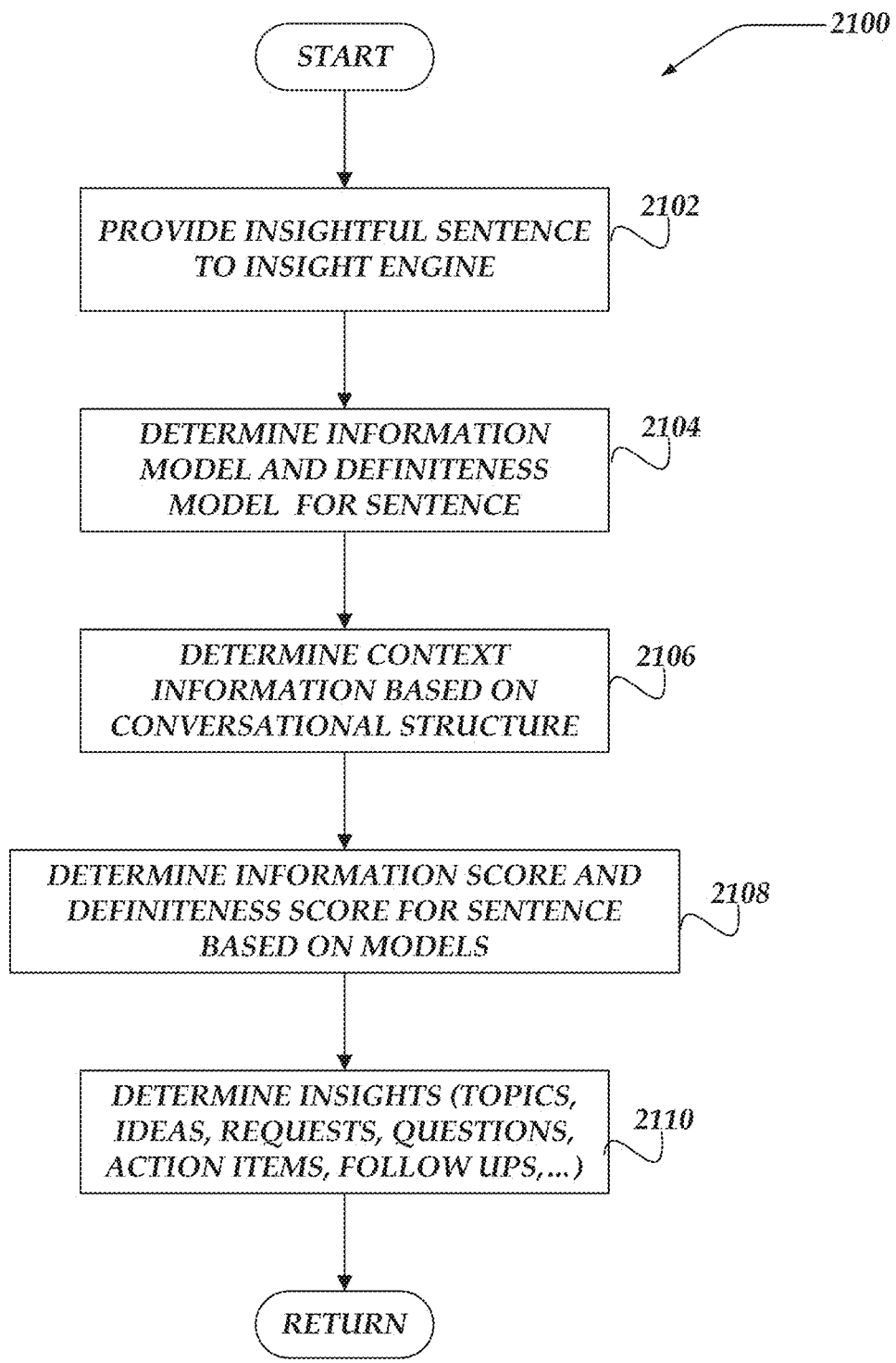
FIG. 21 illustrates a flowchart for a process for evaluating insightful sentences for determining topics and action items from conversations in accordance with one or more of the various embodiments.

FIG. 21 illustrates a flowchart for process 2100 for evaluating insightful sentences for determining topics and action items from conversations in accordance with one or more of the various embodiments. After a start block, at block 2102, in one or more of the various embodiments, a sentence indicated as including insight information may be provided to an insight engine. As described above, sentences determined to include insightful information may be considered insightful sentences because a machine learning engine may have determined that the sentence includes words or phrases that may be associated with one or more insights.

At block 2104, in one or more of the various embodiments, the insight engine may be arranged to determine one or more information models or one or more definiteness models for the sentence. In some embodiments, information models for definiteness models may be selected based on one or more characteristics of the provided insightful sentences. For example, in some embodiments, machine learning engines may be arranged include meta-data that may indicate or recommend which information model or definiteness model may appropriate for a given sentence. Also, in some embodiments, insight engines may be arranged to employ one or more rules or heuristics to select information models or definiteness models based on the sentence. For example, in some embodiments, one or more information models may be determined for sentences that have less words than a defined threshold value whereas one or more other information models may be determined for sentences that include more words. Likewise, in some embodiments, other sentence characteristics, such as, punctuation, key words, question words, action words, or the like, may be evaluated to determine information models or definiteness models for a sentence.

In some embodiments, insight engines may be arranged to employ more than one information model or more than one definiteness model for each sentence. Accordingly, in some embodiments, information models or definiteness models may be arranged to provide scores that may be accumulated. In other embodiments, information models or definiteness models may be arranged hierarchically, such that, one or more models may override or supersede one or more other models.

Accordingly, in some embodiments, insight engines may be arranged to employ configuration information to determine how to determine information models or definiteness models for a given sentence or conversation.

At block 2106, in one or more of the various embodiments, the insight engine may be arranged to determine context information for the sentence based on structure of the conversation. As described above, conversational structure information may enable insight engines to determine dominant portions of a conversion. In some embodiments, one or more of the dominant portions of the conversation may be associated with the key topics of a conversation. Further, in some embodiment, because conversational structure may be based on the entire conversation, it may provide contextual information that may be provided as inputs to one or more information models or definiteness models. For example, in some embodiments, one or more information models or definiteness models may be configured to determine scores that may depend on if a sentence is part of a dominant portion of the conversation.

Note, in some embodiments, one or more information models or one or more definiteness models may be arranged to determine scores without using conversational structure information.

At block 2108, in one or more of the various embodiments, the insight engine may be arranged to determine an information score and a definiteness score for the provided sentence based on the one or more information models or the one or more definiteness models.

In one or more of the various embodiments, information scores may be comprised of various components that may be used to quantify the quality or importance of the content of the sentence. In some embodiments, these components may include, actor/speaker identity, subject words/phrases, object words/phrases, grammatical features, number or type of action verbs, or the like.

In one or more of the various embodiments, insight engines or information models may be arranged to employ ontologies, taxonomies, lexicons, keyword/key phrase dictionaries, or the like, to determine specific insights that may be included in a given insightful sentence. In one or more of the various embodiments, specific key words or phrases may be associated with partial information scores. Likewise, in some embodiments, insight engines may be arranged to employ word counts, word positions, or the like, to determine one or more partial information scores.

In one or more of the various embodiments, insight engines may be arranged to employ one or more grammars or parsers to determine one or more partial information score for a sentence.

In one or more of the various embodiments, insight engines or information models may be arranged to employ one or more heuristic methods to determine an information score for a sentence. In one or more of the various embodiments, sentence associated with higher information scores may be considered to have a higher likelihood of including insights.

In one or more of the various embodiments, insight engines or information models may be arranged to employ conversational structure information to further determine information scores for a sentence. For example, if the sentence under consideration may be associated with a dominant portion of the conversation, its information may be increased. Likewise, in some embodiments, if subjects/objects in a sentence are used across a conversation timeline, the information score for the sentence may be increased.

In some embodiments, information models may be configured or tuned based on the specific problem or subject matter domains. Accordingly, in some embodiments, information models may be arranged to employ various ontologies, taxonomies, lexicons, keyword/key phrase dictionaries, or the like, that may be directed to particular subject matter domains. Accordingly, in some embodiments, information models may be enabled to modify information scores based on terms-of-art for a subject matter domain that otherwise may appear unimportant.

Alternatively, in one or more of the various embodiments, insight engines may employ information models to identify insight related words or phrases independent from having a clear understanding of the underlying subject matter. For example, if a sentence includes words or phrases, such as, "schedule," "appointment," "[X] will do it", "deadline," or the like, the insight engine may be arranged to increase the sentence's information score.

Similar to determine information scores, insight engines may be arranged to employ definiteness models to determine definiteness scores for provided sentences. Accordingly, definiteness models may be configured to evaluate if a sentence includes words or phrases that may indicate that the speaker(s) in the conversation are committed or dedicated to completing the actions included in the sentence. In some embodiments, definiteness models may be arranged to identify specific words or phrases that may indicate the a speaker is hesitant or otherwise unsure about their statements. Accordingly, in some embodiments, definiteness models may employ various ontologies, taxonomies, lexicons, keyword/key phrase dictionaries, grammars, or the like, to identify words that may indicate that the speaker(s) may be hesitant or unsure or their statement. In some embodiments, the particular words or phrases that signal hesitancy or unsurety may be may be associated with weights or partial scores that may be combined to provide the definiteness score for a sentence.

In one or more of the various embodiments, information models or definiteness models may be arranged to employ one or more of knowledge-based techniques, statistical methods, hybrid approaches, or the like, that may be considered similar to semantic analysis to determine information scores or definiteness for sentences. Accordingly, in some embodiments, different models may be arranged to employ different methods. Likewise, in some embodiments, different models may be targeted at identify different types of insights.

At block 2110, in one or more of the various embodiments, the insight engine may be arranged to determine one or more insights that may be associated with the sentence based on the information scores or definiteness scores. In some embodiments, topics may be additionally be determined based on conversational structure information associated with the conversation.

In one or more of the various embodiments, insight engines may be arranged to employ one or more heuristics to associated sentences with one or more particular type of insights. In some embodiments, sentences with action scores that exceed a threshold value may be evaluated to determine if they include action insights. Similarly, in some embodiments, sentences associated with question scores that exceed a threshold value may be evaluated to determine if they include question insights.

In one or more of the various embodiments, insight engines may be arranged to determine the particular rules, instructions, patterns, or the like, for determining insights based on configuration information. For example, in some embodiments, a sentence with a high action score and a high definiteness score may be considered to an action item insight whereas a sentence with a high action score and a lower definiteness score may be considered to include an idea insight rather than an action item.

Next, in one or more of the various embodiments, control may be returned to a calling process.

Figure 22:
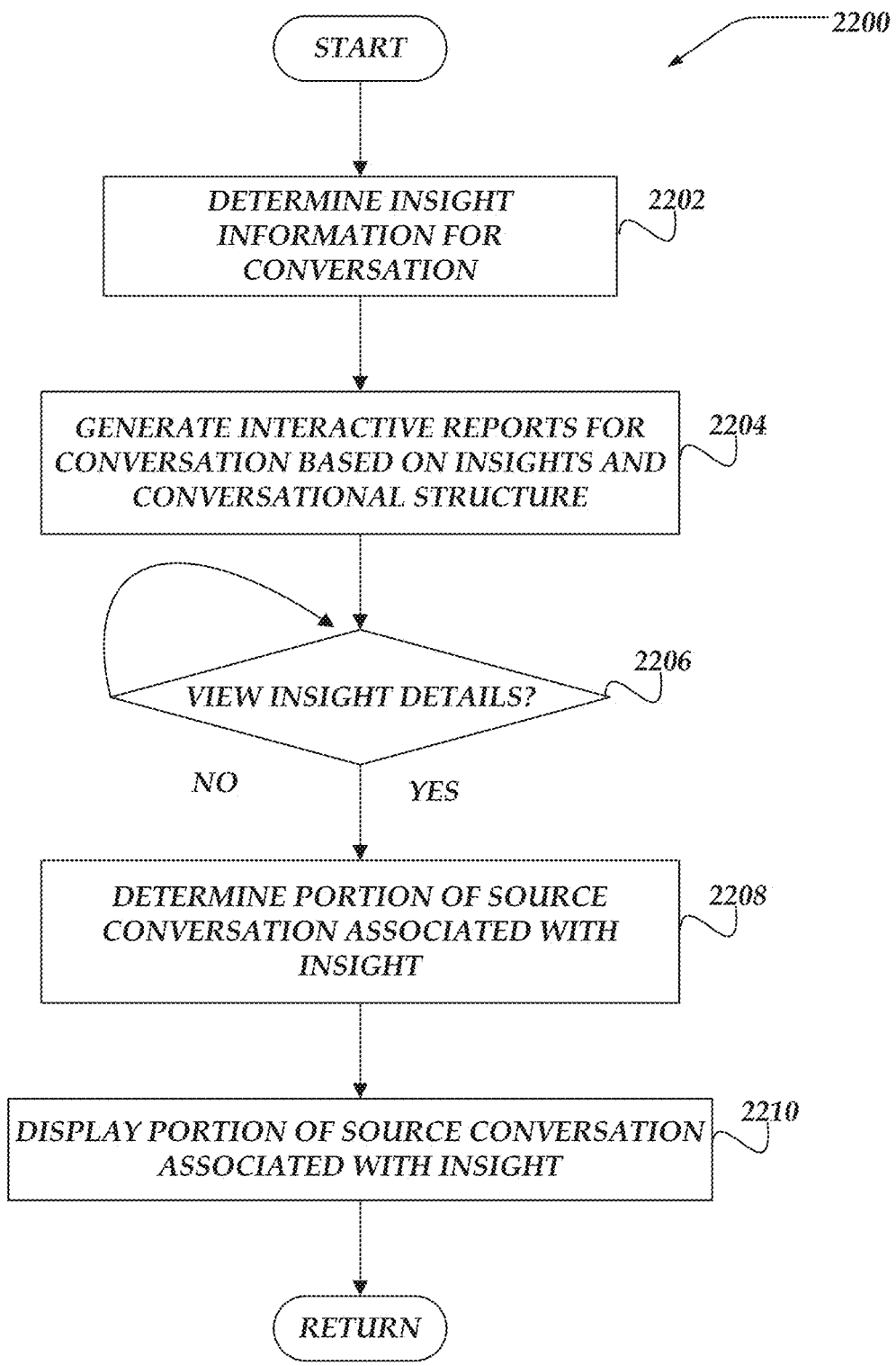
FIG. 22 illustrates a flowchart for a process for determining topics and action items from conversations in accordance with one or more of the various embodiments.

FIG. 22 illustrates a flowchart for process 2200 for determining topics and action items from conversations in accordance with one or more of the various embodiments. After a start block, at block 2202, in one or more of the various embodiments, an insight engine may be arranged to determine one or more insights that may be associated with a source conversation. As described above, in some embodiments, machine learning engines and insight engines may be employed to identify one or more insights included in a source conversation. In some embodiments, insights may include topics, assigned/unassigned action items, appointments, unresolved issues, or the like. In some embodiments, insight engines may be arranged to provide one or more maps, one or more indices, or the like, that may associate insights with related portion(s) of the source conversation. In one or more of the various embodiments, insight engines may be arranged to employ various data structures, such as, lists, arrays, hash tables, b-trees, databases, or the like, to maintain the relationships between determined insights and the portions of the source conversation that may be related to the insights.

At block 2204, in one or more of the various embodiments, an insight engine may be arranged to generate one or more interactive reports regarding the source conversation based on the one or more insights and the conversational structure. In one or more of the various embodiments, interactive reports may be considered documents or user interfaces that enable users to investigate or view various information associated with a source conversation. In some embodiments, such information may include various insights and the related portions of the source conversation. For example, in some embodiments, an insight engine may be arranged to provide an interactive report that displays topics in an outline form enabling users to may select an outline hyperlink (e.g., topics, actions items, or the like) to view the underlying one or more portions of the source conversation that may be associated with the insight.

In one or more of the various embodiments, insight engines may be arranged to provide APIs or interfaces (e.g., REST interfaces, GraphQL endpoints, or the like) that enable integration with other services that may generate static reports, interactive reports, visualizations, or the like. In some embodiments, such interfaces may provide insight information, index information, portions of conversations, or the like, using standard or customized formats (e.g., XML, CSV, JSON, HTML, or the like) that report builders, data visualization tools, or the like, may employ provide interactive reports.

In one or more of the various embodiments, insight engines may be arranged to employ templates, or the like, provided via configuration information to generate one or more interactive reports.

At decision block 2206, in one or more of the various embodiments, if details associated one or more insights may be viewed, control may flow to block 2208; otherwise, control may loop back to decision block 2206. In one or more of the various embodiments, interactive reports may be arranged to include one or more hyperlinks or other user interface controls that enable users to navigate to different portions of the source conversation based on the insights or conversational structure of the source conversation. Note, in some embodiments, the particular layout or design may vary depending on local circumstances or local requirements.

At block 2208, in one or more of the various embodiments, the report engine may be arranged to determine one or more portions of the source conversation that may be associated with the one or more selected insights. In one or more of the various embodiments, the insight information provided by insight engines may enable interactive reports that link insights to their corresponding portions of the source conversation. Accordingly, in one or more of the various embodiments, interactive reports may be arranged to include or support one or more facilities that may determine or retrieve the correct portions of the conversation. In some embodiments, insight engines may be arranged to retrieve portions of the conversation from a data store if provided insight information in a request from a client program. In some embodiments, insight engines may be arranged to provide interactive reports that embed the portions of source conversation in the interactive report rather than requiring requests from clients. For example, in some embodiments, an insight engine may be arranged to provide one or more interactive reports using HTML documents such that one or more portions of the source conversation associated with insights may be hidden or displayed based on user interactions with the document.

At block 2210, in one or more of the various embodiments, insight engines may be arranged to display the one or more portions of the source conversation associated with the one or more selected insights. In some embodiments, the layout or styling of the one or more portions of the conversation may vary depending on the particular report configuration. In some embodiments, organizations, users, or the like, may be enabled to configure the reports that may be available. Accordingly, in some embodiments, insight engines may be arranged to determine the available reports, report formatting, or the like, via configuration information to account for local circumstance or local requirements.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for organizing conversation information over a network using one or more network computers that include one or more processors to perform actions, comprising:
   employing two or more machine learning (ML) models and a plurality of sentences provided from a conversation to generate an insight score for each of the plurality of sentences, wherein each insight score is based on two or more partial insight scores that each correspond to an ML model, and wherein each insight score correlates to a probability that its sentence includes one or more of an action or a question;
   in response to one or more of the plurality of sentences being associated with one or more insight scores that exceed a threshold value, performing further actions, including:
      determining an information score for each of the one or more of the plurality of sentences based on a number of included object words, a number of included subject words, a number of included insight words, and one or more included grammatical features;
      determining a definiteness score for each of the one or more of the plurality of sentences based on decision-making words included in the one or more of the plurality of sentences, wherein each sentence that includes an amount of words associated with conclusive decision-making words are scored higher than each other sentence that includes another amount of words associated with conclusive decision-making words that is less than the amount of words associated with conclusive decision-making words;
      generating one or more insights associated with the conversation based on the one or more of the plurality of sentences, the determined information score for each of the one or more of the plurality of sentences, and the determined definiteness score for each of the one or more of the plurality of sentences; and
      generating a report that associates the one or more insights with one or more portions of the conversation that include the one or more of the plurality of sentences and that are associated with the one or more insights.

2. The method of claim 1, further comprising:
   determining the two or more ML models based on one or more of locale information, subject matter of the conversation, or user preferences, wherein each ML model is paired with an adversarial ML model.

3. The method of claim 1, further comprising:
   determining one or more dominant portions of the conversation based on a conversation digest that corresponds to the conversation;
   determining one or more key subjects that respectively correspond to each of the one or more dominant portions of the conversation, wherein each of the one or more key subjects is a dominant subject in a respective dominant portion of the conversation; and
   generating one or more topics of the conversation based on the one or more key subjects.

4. The method of claim 1, wherein generating the one or more insights further comprises:
   determining one or more action insights that include one or more of an open action item, an unclaimed action item, a closed action item, a follow-up, a task, an idea, or an appointment; and
   determining one or more question insights that include one or more of an unanswered question, an answered question, or a request.

5. The method of claim 1, wherein generating the one or more insights further comprises:
   determining one or more insight models based on the conversation, wherein each insight model defines a set of one or more rules for generating the one or more insights;
   executing each set of one or more rules to identify one or more words that are included in the one or more of the plurality of sentences and that are associated with one or more actions or one or more questions;

modifying the one or more identified words by one or more of removing a superfluous word, correcting grammar, or correcting punctuation; and generating the one or more insights based on the modified one or more identified words.

6. The method of claim 1, wherein generating the report further comprises:

generating, based on the one or more insights, one or more of a task, an appointment, a reminder, or a notification;

providing the one or more of the task, the appointment, the reminder, or the notification to one or more external calendar services.

7. The method of claim 1, wherein generating the report further comprises:

generating a user interface that displays an interactive outline of the conversation, wherein one or more descriptions or one or more labels associated with the one or more insights are displayed as one or more outline headings; and in response to a user selecting one or more of the one or more outline headings, displaying one or more portions of the conversation that are associated with one or more insights that are associated with the selected one or more outline headings.

8. A system for organizing conversation information over a network, comprising:

a network computer, comprising:

a memory that stores at least instructions; and one or more processors that are configured to execute instructions to perform actions, wherein the actions include:

employing two or more machine learning (ML) models and a plurality of sentences provided from a conversation to generate an insight score for each of the plurality of sentences, wherein each insight score is based on two or more partial insight scores that each correspond to an ML model, and wherein each insight score correlates to a probability that its sentence includes one or more of an action or a question;

in response to one or more of the plurality of sentences being associated with one or more insight scores that exceed a threshold value, performing further actions, including:

determining an information score for each of the one or more of the plurality of sentences based on a number of included object words, a number of included subject words, a number of included insight words, and one or more included grammatical features;

determining a definiteness score for each of the one or more of the plurality of sentences based on decision-making words included in the one or more of the plurality of sentences, wherein each sentence that includes an amount of words associated with conclusive decision-making words are scored higher than each other sentence that includes another amount of words associated with conclusive decision-making words that is less than the amount of words associated with conclusive decision-making words;

generating one or more insights associated with the conversation based on the one or more of the plurality of sentences, the determined information score for each of the one or more of the plurality of sentences, and the determined definiteness score for each of the one or more of the plurality of sentences; and generating a report that associates the one or more insights with one or more portions of the conversation that include the one or more of the plurality of sentences and that are associated with the one or more insights; and a client computer, comprising:

another memory that stores at least instructions; and one or more other processors that are configured to execute instructions to perform other actions, wherein the other actions include:

providing the plurality of sentences to the network computer; and displaying the report.

9. The system of claim 8, wherein the one or more processors of the network computer are further configured to execute instructions to perform at least one additional action, wherein the at least one additional action includes:

determining the two or more ML models based on one or more of locale information, subject matter of the conversation, or user preferences, wherein each ML model is paired with an adversarial ML model.

10. The system of claim 8, wherein the one or more processors of the network computer are further configured to execute instructions to perform additional actions, wherein the additional actions include:

determining one or more dominant portions of the conversation based on a conversation digest that corresponds to the conversation;

determining one or more key subjects that respectively correspond to each of the one or more dominant portions of the conversation, wherein each of the one or more key subjects is a dominant subject in a respective dominant portion of the conversation; and generating one or more topics of the conversation based on the one or more key subjects.

11. The system of claim 8, wherein generating the one or more insights further comprises:

determining one or more action insights that include one or more of an open action item, an unclaimed action item, a closed action item, a follow-up, a task, an idea, or an appointment; and determining one or more question insights that include one or more of an unanswered question, an answered question, or a request.

12. The system of claim 8, wherein generating the one or more insights further comprises:

determining one or more insight models based on the conversation, wherein each insight model defines a set of one or more rules for generating the one or more insights;

executing each set of one or more rules to identify one or more words that are included in the one or more of the plurality of sentences and that are associated with one or more actions or one or more questions;

modifying the one or more identified words by one or more of removing a superfluous word, correcting grammar, or correcting punctuation; and generating the one or more insights based on the modified one or more identified words.

13. The system of claim 8, wherein generating the report further comprises:

generating, based on the one or more insights, one or more of a task, an appointment, a reminder, or a notification;

providing the one or more of the task, the appointment, the reminder, or the notification to one or more external calendar services.

14. The system of claim 8, wherein generating the report further comprises:
generating a user interface that displays an interactive outline of the conversation, wherein one or more descriptions or one or more labels associated with the one or more insights are displayed as one or more outline headings; and
in response to a user selecting one or more of the one or more outline headings, displaying one or more portions of the conversation that are associated with one or more insights that are associated with the selected one or more outline headings.

15. A processor readable non-transitory storage medium that includes instructions for organizing conversation information over a network, wherein execution of the instructions by one or more hardware processors causes actions to be performed, wherein the actions comprise:
employing two or more machine learning (ML) models and a plurality of sentences provided from a conversation to generate an insight score for each of the plurality of sentences, wherein each insight score is based on two or more partial insight scores that each correspond to an ML model, and wherein each insight score correlates to a probability that its sentence includes one or more of an action or a question;
in response to one or more of the plurality of sentences being associated with one or more insight scores that exceed a threshold value, performing further actions, including:
determining an information score for each of the one or more of the plurality of sentences based on a number of included object words, a number of included subject words, a number of included insight words, and one or more included grammatical features;
determining a definiteness score for each of the one or more of the plurality of sentences based on decision-making words included in the one or more of the plurality of sentences, wherein each sentence that includes an amount of words associated with conclusive decision-making words are scored higher than each other sentence that includes another amount of words associated with conclusive decision-making words that is less than the amount of words associated with conclusive decision-making words;
generating one or more insights associated with the conversation based on the one or more of the plurality of sentences, the determined information score for each of the one or more of the plurality of sentences, and the determined definiteness score for each of the one or more of the plurality of sentences; and
generating a report that associates the one or more insights with one or more portions of the conversation that include the one or more of the plurality of sentences and that are associated with the one or more insights.

16. The medium of claim 15, wherein execution of the instructions by the one or more hardware processors causes at least one additional action to be performed, wherein the at least one additional action includes:
determining the two or more ML models based on one or more of locale information, subject matter of the conversation, or user preferences, wherein each ML model is paired with an adversarial ML model.

17. The medium of claim 15, wherein execution of the instructions by the one or more hardware processors causes additional actions to be performed, wherein the additional actions include:
determining one or more dominant portions of the conversation based on a conversation digest that corresponds to the conversation;
determining one or more key subjects that respectively correspond to each of the one or more dominant portions of the conversation, wherein each of the one or more key subjects is a dominant subject in a respective dominant portion of the conversation; and
generating one or more topics of the conversation based on the one or more key subjects.

18. The medium of claim 15, wherein generating the one or more insights further comprises:
determining one or more action insights that include one or more of an open action item, an unclaimed action item, a closed action item, a follow-up, a task, an idea, or an appointment; and
determining one or more question insights that include one or more of an unanswered question, an answered question, or a request.

19. The medium of claim 15, wherein generating the one or more insights further comprises:
determining one or more insight models based on the conversation, wherein each insight model defines a set of one or more rules for generating the one or more insights;
executing each set of one or more rules to identify one or more words that are included in the one or more of the plurality of sentences and that are associated with one or more actions or one or more questions;
modifying the one or more identified words by one or more of removing a superfluous word, correcting grammar, or correcting punctuation; and
generating the one or more insights based on the modified one or more identified words.

20. The medium of claim 15, wherein generating the report further comprises:
generating, based on the one or more insights, one or more of a task, an appointment, a reminder, or a notification;
providing the one or more of the task, the appointment, the reminder, or the notification to one or more external calendar services.

21. The medium of claim 15, wherein generating the report further comprises:
generating a user interface that displays an interactive outline of the conversation, wherein one or more descriptions or one or more labels associated with the one or more insights are displayed as one or more outline headings; and
in response to a user selecting one or more of the one or more outline headings, displaying one or more portions of the conversation that are associated with one or more insights that are associated with the selected one or more outline headings.

22. A network computer for organizing conversation information over a network, comprising:
a memory that stores at least instructions; and
one or more processors that are configured to execute instructions to perform actions, wherein the actions include:
employing two or more machine learning (ML) models and a plurality of sentences provided from a conversation to generate an insight score for each of the plurality of sentences, wherein each insight score is based on two or more partial insight scores that each correspond to an ML model, and wherein each insight score correlates to a probability that its sentence includes one or more of an action or a question;

in response to one or more of the plurality of sentences being associated with one or more insight scores that exceed a threshold value, performing further actions, including:
- determining an information score for each of the one or more of the plurality of sentences based on a number of included object words, a number of included subject words, a number of included insight words, and one or more included grammatical features;
- determining a definiteness score for each of the one or more of the plurality of sentences based on decision-making words included in the one or more of the plurality of sentences, wherein each sentence that includes an amount of words associated with conclusive decision-making words are scored higher than each other sentence that includes another amount of words associated with conclusive decision-making words that is less than the amount of words associated with conclusive decision-making words;
- generating one or more insights associated with the conversation based on the one or more of the plurality of sentences, the determined information score for each of the one or more of the plurality of sentences, and the determined definiteness score for each of the one or more of the plurality of sentences; and
- generating a report that associates the one or more insights with one or more portions of the conversation that include the one or more of the plurality of sentences and that are associated with the one or more insights.

23. The network computer of claim 22, wherein the one or more processors execute the instructions to perform at least one additional action, wherein the at least one additional action includes:
- determining the two or more ML models based on one or more of locale information, subject matter of the conversation, or user preferences, wherein each ML model is paired with an adversarial ML model.

24. The network computer of claim 22, wherein the one or more processors execute the instructions to perform additional actions, wherein the additional actions include:
- determining one or more dominant portions of the conversation based on a conversation digest that corresponds to the conversation;
- determining one or more key subjects that respectively correspond to each of the one or more dominant portions of the conversation, wherein each of the one or more key subjects is a dominant subject in a respective dominant portion of the conversation; and
- generating one or more topics of the conversation based on the one or more key subjects.

25. The network computer of claim 22, wherein generating the one or more insights further comprises:
- determining one or more action insights that include one or more of an open action item, an unclaimed action item, a closed action item, a follow-up, a task, an idea, or an appointment; and
- determining one or more question insights that include one or more of an unanswered question, an answered question, or a request.

26. The network computer of claim 22, wherein generating the one or more insights further comprises:
- determining one or more insight models based on the conversation, wherein each insight model defines a set of one or more rules for generating the one or more insights;
- executing each set of one or more rules to identify one or more words that are included in the one or more of the plurality of sentences and that are associated with one or more actions or one or more questions;
- modifying the one or more identified words by one or more of removing a superfluous word, correcting grammar, or correcting punctuation; and
- generating the one or more insights based on the modified one or more identified words.

27. The network computer of claim 22, wherein generating the report further comprises:
- generating, based on the one or more insights, one or more of a task, an appointment, a reminder, or a notification;
- providing the one or more of the task, the appointment, the reminder, or the notification to one or more external calendar services.

28. The network computer of claim 22, wherein generating the report further comprises:
- generating a user interface that displays an interactive outline of the conversation, wherein one or more descriptions or one or more labels associated with the one or more insights are displayed as one or more outline headings; and
- in response to a user selecting one or more of the one or more outline headings, displaying one or more portions of the conversation that are associated with one or more insights that are associated with the selected one or more outline headings.

* * * * *